(12) United States Patent
Ohashi

(10) Patent No.: US 7,321,896 B1
(45) Date of Patent: Jan. 22, 2008

(54) COMPONENT MANAGEMENT SYSTEM, COMPONENT MANAGEMENT DEVICE, AND COMPUTER-READABLE RECORDING MEDIUM

(75) Inventor: Tadashi Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 717 days.

(21) Appl. No.: 09/626,965

(22) Filed: Jul. 27, 2000

(30) Foreign Application Priority Data

Sep. 27, 1999 (JP) .................................. 11-273427

(51) Int. Cl.
*G06F 17/00* (2006.01)
(52) U.S. Cl. .......................................... 707/102; 707/4
(58) Field of Classification Search ................ 709/313; 707/103 R, 200, 100, 10, 4, 8; 717/178; 365/189.02; 705/1; 706/53
See application file for complete search history.

(56) References Cited

U.S. PATENT DOCUMENTS

| | | | | |
|---|---|---|---|---|
| 4,591,983 | A * | 5/1986 | Bennett et al. ............... | 706/53 |
| 4,610,000 | A * | 9/1986 | Lee ........................ | 365/189.02 |
| 5,778,368 | A * | 7/1998 | Hogan et al. .................. | 707/10 |
| 5,826,265 | A * | 10/1998 | Van Huben et al. ............ | 707/8 |
| 5,838,965 | A * | 11/1998 | Kavanagh et al. ...... | 707/103 R |
| 5,926,636 | A * | 7/1999 | Lam et al. ................... | 709/313 |
| 5,950,012 | A * | 9/1999 | Shiell et al. ................ | 717/169 |
| 6,154,738 | A * | 11/2000 | Call .............. | 707/4 |
| 6,336,078 | B1* | 1/2002 | Sakayori et al. .............. | 702/81 |

FOREIGN PATENT DOCUMENTS

JP 5-216935 8/1993

OTHER PUBLICATIONS

Daniel Lyons, "The New Face of Artificial Intelligence" (Company Business and Marketing), Nov. 30, 1998, Forbes, ISSN: 0015-6914.*

"Boeing Upgrades On-Line Maintenance Information Service"Aug. 13, 1997, PR Newswire, p0813SFW025.*

Ryuuhei Uchida, *Special Issue: Fujitsu's CAD Technologies, Product Data Management System*, vol. 45, 5th Edition, (Fujitsu Limited, Sep. 10, 1994), pp. 392-398, including English language translation (15 pages).

Masahiro Nakamura, *Nikkei Electronics, Asynchronous Update of Duplicated Files As A Core Technology in Distributed Database*, No. 609 (Nikkei Business Publications, Inc. Jun. 6, 1994), pp. 101-110, including English language translation (8 pages).

Japanese Office Action Issued on Mar. 7, 2006 in Japanese Patent Application No. 11-273427 corresponding to the above-identified pending U.S. patent application (2 pages), including English language translation thereof (4 pages).

(Continued)

*Primary Examiner*—John Breene
*Assistant Examiner*—Giovanna B. Colan
(74) *Attorney, Agent, or Firm*—Staas & Halsey LLP

(57) ABSTRACT

A component management system comprises a storage device for storing a plurality of components related to hardware and firmware which are necessary for the development, manufacture, inspection, and the like of a product as a component data base. The hardware and the firmware constituting the product are at the same management level. The system further comprises a management server for managing the component data base. A reception-related client is connected to the management server via a network N and it can take out a predetermined component from the component data base via the network N.

13 Claims, 36 Drawing Sheets

OTHER PUBLICATIONS

Ryuuhei Uchida, *Product Data Management System*, *Fujitsu*, vol. 45, No. 5, Special Issue: Fujitsu's CAD Technologies (Sep. 10, 1994), pp. 392-398).

*Nikkei Electronics*, No. 609 (Nikkei Business Publications, Inc., Jun. 6, 1994), pp. 101-110.

* cited by examiner

FIG.3

| PART NAME | DRAWING NUMBER | VERSION NUMBER | SK |
|---|---|---|---|
| PROM | LOCA41000-1000 | (01) | |
| FIRMWARE | CA41000-100X | (01) | |

SK_F

| DRAWING NUMBER=<br>CA41000-100X(01) | PART NAME=<br>FIRMWARE |
|---|---|
| HISTORY | H9CA41000-1000a.xml |
| ECO/NRN | E1CA41000-1000a.xml |
| LOAD MODULES<br>(OBJECTS) | M9CA41000-1000a.rom<br>M9CA41000-1001a.rom |
| LOAD PROGRAM<br>LOAD CONTROL | L9CA41000-1000a.exe<br>C9CA41000-1001a.txt |
| PATCHES | P9CA41000-1000a.exe |
| MANUALS | MTCA41000-1000a.doc |

FIG.4

```
F1
<?xml version=" 1.0" ?>
  <TITLE>server</TITLE>
  <COMPONENT NAME>PCB</COMPONENT NAME>
  <COMPONEMT NUMBER>CA20001-000X</COMPONENT NUMBER>
      <PART NAME>PROM</PART NAME>
      <PART NUMBER>CA41000-1000</PART NUMBER>
              .
              .
              .
      <PART NAME>FIRMWARE</PART NAME>
      <PART NUMBER>CA41000-100X</PART NUMBER>
  <WEB FILTER>
      <MODEL>X8777S、X8777D、X8777Z</MODEL>
      <SERIAL NO>00100-01233<SERIAL NO>
      <USER>*ABC Co.LTD</USER>
  </WEB FILTER>
  <COMPONENT MODULE>
      <MODULE>CA20001-0000.ps</MODULE>
      <MODULE>CA20001-0000.doc</MODULE>
              .
              .
              .
  </COMPONENT MODULE>
              .
              .
```

FIG.11

| | WHERE TO SEND | NUMBER OF COPIES | | |
|---|---|---|---|---|
| 1 | MANUFACTURE) MANUFACTURE ENGINEER | | | |

G3

NEW/REVISED DESIGN NOTICE
(NRN/ECO)

ECO/NRN NUMBER : F0199Z75990 (Z: NEW, A: REVISED):EC---19  APPROVED  EXAMINED  DESIGNED
　　　　　　　　　　　　　　　　　　　　　　　　　　　　　　　　1999.08.23  1999.08.23  1999.08.23
　　　　　　　　　　　　　　　　　　　　　　　　　　　　　　　　XXXX　　　　XXXX　　　　XXXXX
NAME OF COMPONENT : Programable Read Only Memory　　ISSUER) XXXXX
TYPICAL　　　　　　　　　　　　　　　　　　　WHERE TO MAKE CONTACT) XXXXX
MODEL NAME : PROM　　　　　　　　　　　　　　　　　　　　E-MAIL) XXXXX

EC MANAGEMENT :
☐REQUIRED
☐NOT REQUIRED

| DRAWING NUMBER | /6 | VERSION | PART NAME OR MODEL | MAKER | NOTES |
|---|---|---|---|---|---|
| LOCA41000-1000 | | 01 | PROM | FFFF | |

1.POINT OF CHANGE  : ☐XXX XXX  ☐XXX XXX ( )
2.REASON OF IMPROVEMENT  ☐XXX XXX  ☐XXX XXX
　　　　　　　　　　　　　☐XXX XXX
　　　　　　　　　　　　　☐XXX XXX ( )

3.PHASE OF OCCURRENCE  : ☐XXX XXX  ☐XXX XXX ( ))
　　　　　　　　　　　　☐XXX XXX  ☐XXX XXX

4.DEPARTMENT OF OCCURRENCE : ☐XXX XXX  ☐XXX XXX
5.CAUSE OF OCCURRENCE  : ☐XXX XXX ( ) ☐XXX XXX
　　　　　　　　　　　　☐XXX XXX  ☐XXX XXX

APPLICATION  : ☐XXX XXX  ☐XXX XXX (~~)
SPECIAL MENTION  IMMEDIATE APPLICATION

FIG.12

```
<?xml version=" 1.0" ?>
<ECO/NRN>ECO</ECO/NRN>
<WHERE TO DISTRIBUTE> TOKYO HEADQUARTERS </WHERE TO DISTRIBUTE>
<WHERE TO DISTRIBUTE> NUMAZU FACTORY </WHERE TO DISTRIBUTE>
<WHERE TO DISTRIBUTE> AUSTRALIA FACTORY </WHERE TO DISTRIBUTE>
<WHERE TO SUPPLY> AAA CORPORATION </WHERE TO SUPPLY>
<WHERE TO SUPPLY> BBB BUSINESS CORPORATION </WHERE TO SUPPLY>
<REASON OF CHANGE>
    <DESIGN ERROR> 1 </DESIGN ERROR>
    <OCCURRENCE OF PROBLEM> 1 </OCCURRENCE OF PROBLEM>
    <SOLUTION OF PROBLEM> 0 </SOLUTION OF PROBLEM>
    <CHANGE OF SPECIFICATION> 0 </CHANGE OF SPECIFICATION>
    <CHANGE OF STANDARD> 0 </CHANGE OF STANDARD>
```

NRN/ECO
(ECO)

ECO NUMBER = F0/99A0001
WHERE TO DISTRIBUTE = TOKYO HEADQUARTERS
WHERE TO DISTRIBUTE = NUMAZU FACTORY
WHERE TO DISTRIBUTE = AUSTRALIA FACTORY
WHERE TO SUPPLY = AAA CORPORATION
WHERE TO SUPPLY = BBB BUSINESS CORPORATION
REASON OF CHANGE
☑ DESIGN ERROR
☑ OCCURRENCE OF PROBLEM
☐ SOLUTION OF PROBLEM
☐ CHANGE OF SPECIFICATION
☐ CHANGE OF STANDARD

MODEL TO BE DISTRIBUTED

| x8777S |
| x8777D |
| x8777Z |
|        |

MANUFACTURE NUMBER
TO BE DISTRIBUTED

| 00100 | ~ | 01233 |

WHERE TO DISTRIBUTE

| * | ABC Co.LTD. |

COMPONENT MANAGEMENT SYSTEM, COMPONENT MANAGEMENT DEVICE, AND COMPUTER-READABLE RECORDING MEDIUM

FIELD OF THE INVENTION

The present invention relates to a component management system for integrally managing components (such as a hardware drawing, a firmware drawing, a document, a source code, a specification) which are indispensable for manufacturing a device. Hardware and firmware of the device are regarded as the same level parts. This invention also relates to a component management device, and a computer-readable recording medium for recording a component management program.

BACKGROUND OF THE INVENTION

An enterprise doing business of manufacturing a device/unit needs various kinds of components of firmware (programs) in addition to a design drawing, a specification, and a contract document in a series of processes of a development process, a design process, a manufacture process, an inspection process, and a shipment process. The components are broadly classified into hardware components and firmware components. Accordingly, the enterprise separately manages the hardware components and the firmware components.

However, since the hardware components and the firmware components are primarily applied to the same product, the separate management of both the components is apt to produce a managing error, a reduced management efficiency and an increased time from development to shipment. Thus, the separate management of both the components is not advisable. Therefore, there has been required a device or a method for solving such problems.

FIG. 36 is an illustration showing the development and manufacture process of a product in a prior art. In FIG. 36, a design department conducts in sequence processing from step S1 to step S9. That is, at the step S1 is created a functional specification compiling specifications relating to the functions of the product and at step S2 is made an internal specification compiling specifications relating to the internal constitution of the product.

At the next step S3 is created a manufacture and assembly specification compiling specifications relating to the manufacture and assembly of the product and at step S4 is created a test and inspection specification compiling specifications relating to the test and inspection of the manufactured product. At step S5, there is created a version number management table for managing the number of versions of various kinds of specifications and design drawings.

In actuality, the above-mentioned functional specification, the internal specification, and the like (hereinafter referred to as "various kinds of specifications, . . . , the version number management table") are created at step S6 by using a workstation or a personal computer. At step S7 is developed, for example, the source code of a firmware mounted on the product based on the various kinds of specifications and then at step S8 is created an object (code) by compiling the above-mentioned source code. At step S9, the above object (code) and the various kinds of specifications are recorded on recording medium 1 and then the recording medium 1 is supplied to a factory from the design department.

In this manner, in the factory, the above object (code) and the various kinds of specifications are introduced into a workstation or a personal computer from the recording medium at step S10 and then an object code is compiled at step S11. At the next step S12, the object code (firmware) is mounted on a target machine (product) according to the manufacture and assembly specification (see step S3). To be specific, the object code (firmware) is written into a programmable read only memory (PROM) packaged in the target machine.

At step S15, a test and an inspection are performed on the target machine according to the test and inspection specification (see step S4) and then the target machine passing the test and the inspection is shipped at step S14. Further, a field test is performed on the target machine at step S15 and then the target machine passing the field test is delivered to a user.

A firmware has been mainly described above. However, when the device/unit is manufactured, a design department conducts a design relating to a hardware constituting the device/unit as well as a design relating to a firmware. Specifically, the design department makes various kinds of design drawings relating to the hardware such as a parent component drawing, a child component drawing, a logic circuit drawing, a printed circuit board packaging drawing, and a hardware test specification, and the like.

The above-mentioned parent component drawing shows a table of components of the device/unit and the child component drawing shows the constitution of the components described on the child component drawing. The logic circuit drawing shows a logic circuit of the device and the printed circuit board packaging drawing shows a packaging state when parts are mounted on a printed circuit board. The hardware test specification compiles specifications relating to various kinds of tests of checking the actions of the assembled device.

Design drawings and the like relating to the hardware will be called hardware components. Similarly, the various kinds of specifications relating to the firmware described above will be called firmware components. These hardware components and firmware components are separately managed under different rules in the management department and are distributed to factories and the like when necessary. In the case where the hardware component or the firmware component is revised because of a change in design or the like, the management department manages the number of versions separately.

A client/server-type system has been conventionally used as a unit for managing the hardware components and the firmware components. This system is schematically constituted by a server placed in the management department and a plurality of clients placed in the factory and the like and accessible to the server via a network.

In the server are separately registered the hardware components and the firmware components. A client refers to the hardware components and the firmware components by using a browser. The client receives the hardware components and the firmware components via a network N. The operations relating to these reference and reception are performed by the operator of the client.

In the above-mentioned system, the place to which the hardware components and the firmware components are distributed (client) is limited by checking a password for the purpose of ensuring a security. In other words, in the conventional system, the place to which the hardware components and the firmware components are distributed is limited for each client by checking a pass word of the client.

To be specific, it is allowed to distribute specific hardware components and firmware components to a client invested with a specific password and it is prohibited to distribute specific hardware components and firmware components to a client invested with a password other than a specific password. In the conventional system, in the case where a defect is found in the firmware of the firmware component, a patch work, that is, a correction work is manually performed based on the specification written on a paper medium.

As described above, the hardware components and the firmware components are separately managed in the prior art. This is ascribable to the fact that, in general, a hardware development and a firmware development are separately performed in a product development.

However, the hardware components and the firmware components are used in an organic relation in the manufacture of a device. Accordingly, when the hardware components and the firmware components which are separately managed are organically related to each other, there is presented as a matter of course a problem that a working error is caused by forcibly relating the hardware components to the firmware components.

Following problem is generated in the management department. That is, because there are two kinds of management rules, a management rule for the hardware components and a management rule for the firmware components, a management work becomes troublesome and the amount of management work dramatically increases as the objects to be managed increase in number. Similarly, the management of the version number of the components requires a complicated work because the management of the version number of the hardware components and the management of the version number of the firmware components are separately performed.

The conventional system has a drawback that it is incapable of taking security measures to every detail. In other words, in the conventional system, a limitation is imposed on the place to which the hardware components and the firmware components are distributed for each client by checking the password of the client, it is impossible to impose a limitation on the place to which each component is distributed, for example, to impose a limitation on the place where only parent and child component drawings of the hardware components are distributed.

Further, when a correction is made to a firmware, the conventional system presents problems of causing a working error and a long working hour because a patch work is manually performed based on a specification written on a paper medium.

Still further, since the conventional system requires that a series of works of a management work, a reception work, a reference work and a patch work relating to the hardware components and the firmware components be manually performed by an operator, a manager, and a worker, it confines the hours for performing the series of works to working hours. This presents a problem that the working efficiency of the conventional system is very low.

SUMMARY OF THE INVENTION

It is an object of this invention to provide a component management system, a component management device, and a computer-readable recording medium for recording a component management program capable of improving the management efficiency of components and the management efficiency of the version number of the components and of preventing a working error and shortening working hours.

According to a component management system of one aspect of this invention, the storage unit stores a plurality of components related to the hardware and the firmware (for example, a design drawing, a firmware itself, various kinds of documents) without separating them. Accordingly, a server can manage the components in a unified way. Further, the client can take out a desired component from the components managed by the server. In this manner, the hardware and the firmware are regarded as the same management level and the components related to both of them are managed in a unified way. Accordingly, this can improve the management efficiency of the version number of the components and can prevent the occurrence of a working error and the management efficiency of the components as compared with the conventional case where the components relating to the hardware and the firmware are separately managed.

According to a component management device of another aspect of this invention, a storage unit stores the plurality of components related to the hardware and the firmware (for example, a design drawing, a firmware itself, various kinds of documents) without separating them. Accordingly, a management unit can manage the components in a unified way. Further, the client can take out a desired component from the components managed by the server. In this manner, the hardware and the firmware are regarded as the same management level and the components related to both of them are managed in a unified way. This can improve the management efficiency of the version number of the components and the management efficiency of the components and can prevent the occurrence of a working error as compared with the conventional case where the components relating to the hardware and the firmware are separately managed.

Further, the client takes out the desired component from the plurality of components constituting the hierarchical structure based on the meta-information. Thus, the plurality of components constitute the hierarchical structure and therefore the client side can easily take out the component of a lower layer from the component of a higher layer based on the meta-information.

Further, the client can take out the applicable component only in the case of permission based on the taking-out limiting information. Thus, the meta-information comprises taking-out limiting information related to the permission/non-permission of taking-out for each component, and therefore it is possible to take security measures for an extremely small unit of each component.

Further, when the component including the patch information is taken out by the client, the patch processing is automatically performed to the firmware in the client. Thus, the component comprises the patch information and the client side automatically performs the patch processing, and therefore it is possible to prevent a working error and to shorten a working hour as compared with the conventional case where the patch work is manually performed.

Further, the plurality of components constitute a hierarchical structure and therefore it is possible to easily retrieve a desired component without separating the hardware from the firmware.

Further, when the client receives the notice of revision or the notice of new registration, the client takes this reception as a trigger and takes out the applicable component at an arbitrary timing. The arbitrary timing means a time just after the client receives the notice of revision or the notice of new registration or a night time. Thus, when the component is revised or in the case where a new component is registered in the storage unit, the notice of revision or the notice of new registration can make the client take out the applicable component in real time (or at an arbitrary time). Accordingly, it is possible to prevent the omission of notice and to improve working efficiency because the client can takes out the applicable component during a night time.

Further, the management unit conducts communications related to the development consignment of the product with the development maker side client and therefore it is possible to conduct communications related to the development consignment of the product, which results in shortening a period required to develop the product.

Further, the management unit conducts communications for getting the permission of quotation of the catalog with the author side client and therefore it is possible to quickly get the permission of quotation of the catalog.

According to a computer-readable recording medium of still another aspect of this invention, a component management program is recorded in this medium. The component management program comprises the steps of a storage process and a management process. In the storage process, the plurality of components related to the hardware and the firmware (for example, a design drawing, a firmware itself, various kinds of documents, and the like) are stored in the storage unit without separating the hardware from the firmware. Accordingly, in the management process, the plurality of components are managed in a unified way and a control when the client takes out a predetermined component from the plurality of components via the network is performed. Thus, the hardware and the firmware are regarded as the same management level and the plurality of components related to both of them are managed in a unified way. Accordingly, this can improve the management efficiency of the version number and the management efficiency of the components and can prevent the occurrence of a working error as compared with the conventional case where the components related to the hardware and the firmware are separately managed.

Other objects and features of this invention will become apparent from the following description with reference to the accompanying drawings.

BRIEF DESCRIPTION OF THE DRAWINGS

FIG. 3 is an illustration describing meta-information of the preferred embodiment in accordance with the present invention;

FIG. 4 is an illustration showing a meta-information file $F_1$ in the preferred embodiment in accordance with the present invention;

FIG. 11 is an illustration showing an NRN/ECO input screen $G_3$ in the preferred embodiment in accordance with the present invention;

FIG. 12 is an illustration showing an NRN/ECO file $F_2$ in the preferred embodiment in accordance with the present invention;

FIG. 13 is an illustration showing an NRN/ECO screen $G_4$ in the preferred embodiment in accordance with the present invention;

FIG. 18 is an illustration showing a sub-menu screen $G_5$ in the preferred embodiment in accordance with the present invention;

DESCRIPTION OF THE PREFERRED EMBODIMENTS

One preferred embodiment of a component management system, a component management device, and a computer-readable recording medium recording a component management program, which are associated with the present invention, will be hereinafter described in detail with reference to the drawings.

Figure 1:
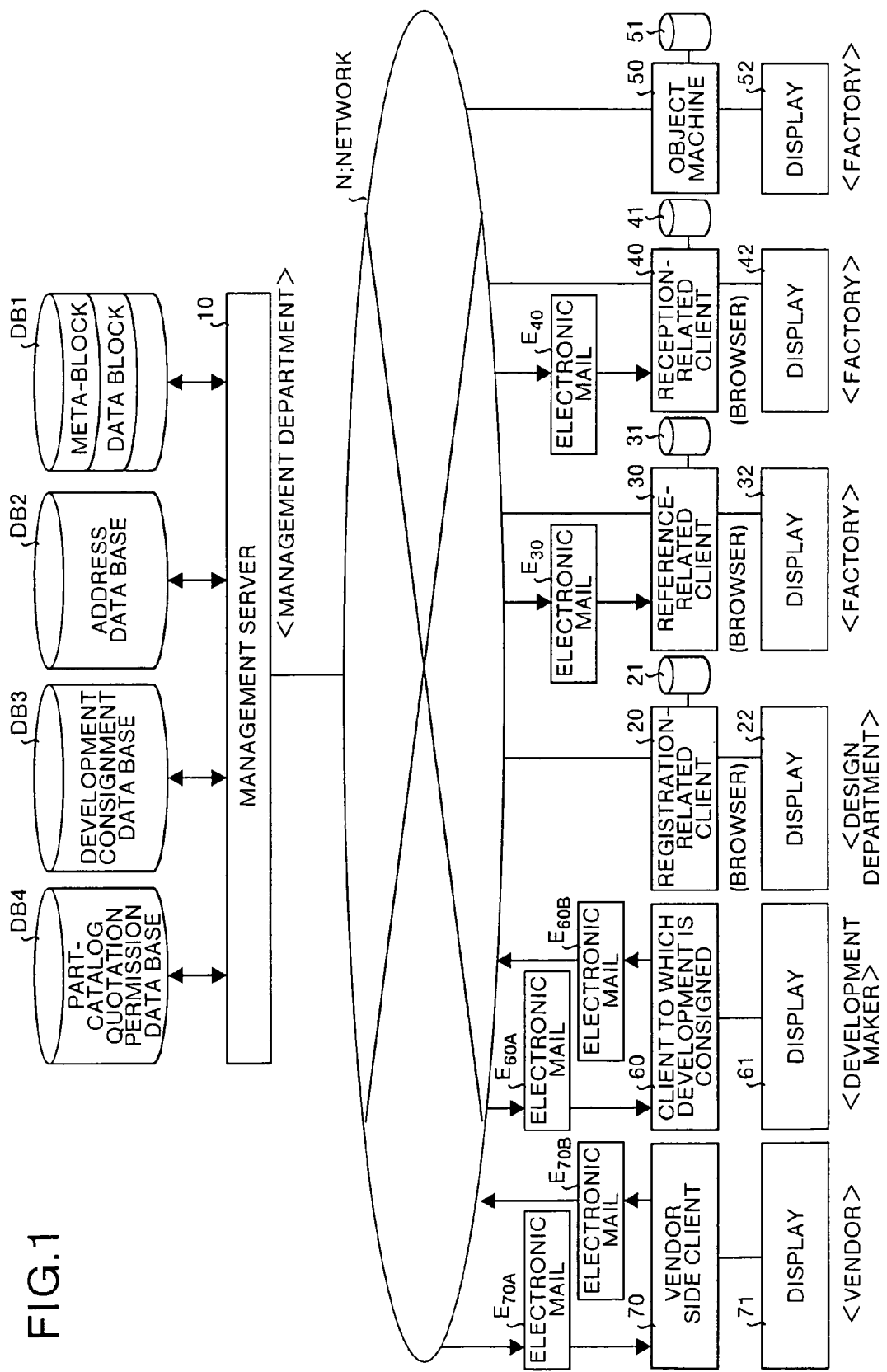
FIG. 1 is a block diagram showing the constitution of a preferred embodiment in accordance with the present invention.

FIG. 1 is a block diagram showing the constitution of one preferred embodiment in accordance with the present invention. The component management system shown in FIG. 1 is schematically constituted by a management server 10, a registration-related client 20, a reference-related client 30, a reception-related client 40, an object machine 50, a development consignee client 60, and a vendor side client 70. All these components are connected to a network N (for example, the Internet), respectively.

The management server 10 is placed in a management department of a maker manufacturing a product such as a device or a unit and performs the management of a plurality of electronized components, a processing related to a development consignment to an external development maker, and a processing related to a part-catalog quotation permission to an external vendor via the network N. The component means a thing which is generated in processes from the development/design of a product to the manufacture thereof and can be electronized, such as the drawing of a hardware constituting the product, a firmware, various kinds of programs, a specification, a contract document, and the like.

A component data base DB1 is constituted by a plurality of electronized components having a hierarchical structure (see FIG. 2) and is stored in a not shown storage device. The plurality of electronized components are registered in the component data base DB1 by the registration-related client 20 described below.

Figure 2:
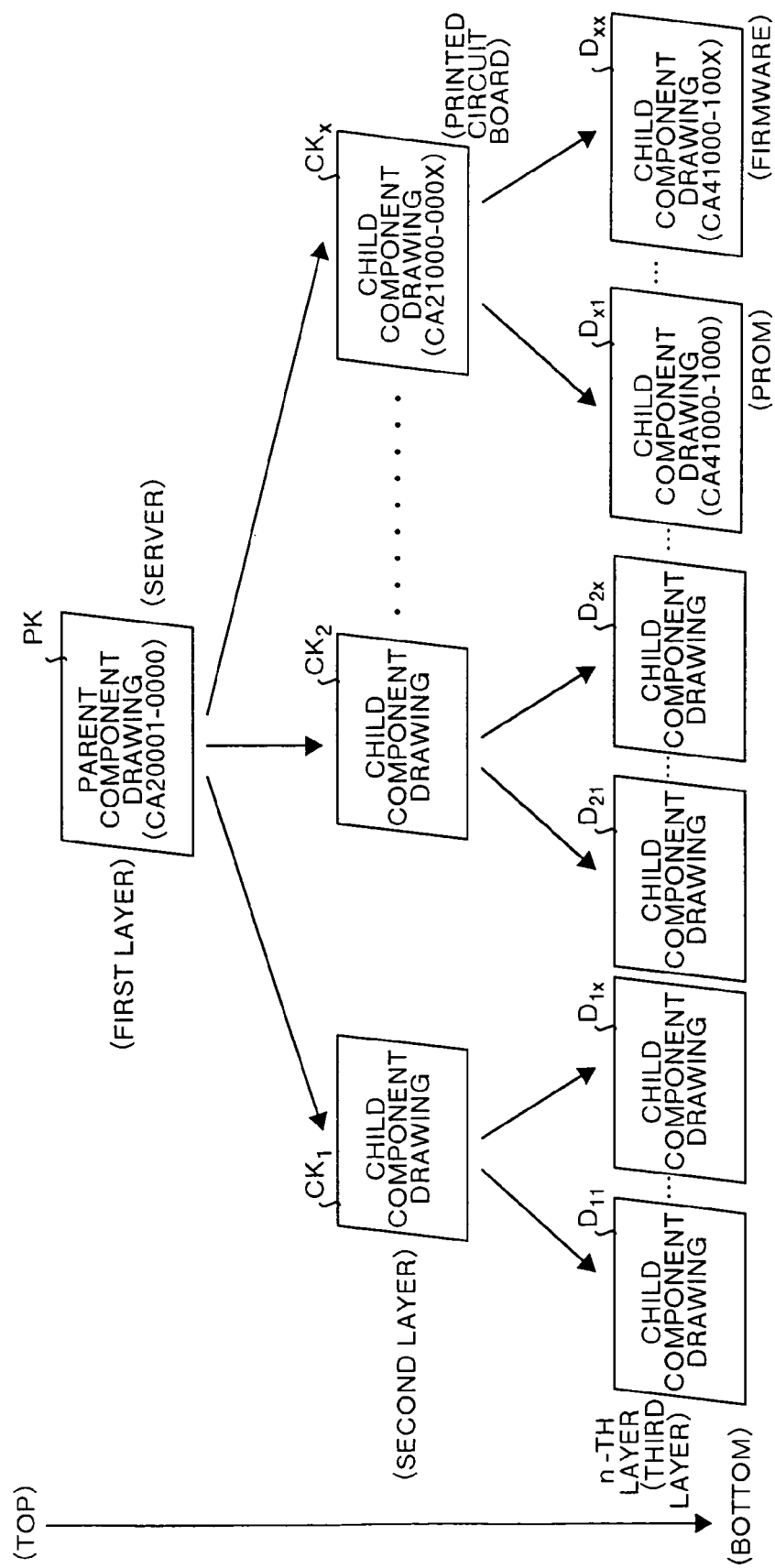
FIG. 2 is an illustration showing a hierarchical structure in the preferred embodiment in accordance with the present invention.

The hierarchical structure in the component data base DB1 will be described by using a server as one example of the product with reference to FIG. 2. As shown in FIG. 2, the component data base DB1 related to the server has n-layers (three layers) from the first layer to the n-th (third) layer. The first layer is the top (highest) layer and the n-th layer (third layer) is the bottom (lowest) layer. In this respect, a parent component drawing PK, child component drawings $CK_1$–$CK_X$, and child component drawings $D_{11}$–$D_X$ are electronic data into which a paper document is electronized such as a firmware, a program and the like.

The parent component drawing PK positioned in the first layer is the one called a parent drawing and corresponds to a table of x-pieces of main components constituting a server (device/unit) (hereinafter referred to as main components). The main components comprise a box, an electric power source, a printed circuit board, and the like. A parent component drawing number for identification "CA20002-OOOO" is attached to the parent component drawing PK.

In the second layer, each of the child component drawings $CK_1$–$CK_X$, is linked to the x-pieces of main components in the parent component drawing PK and corresponds to a table of a plurality of items constituting the main components (a hardware part, a firmware, a specification, a program and the like): that is, the child component drawings $CK_1$–$CK_X$ are slaved to the parent component drawing PK. It should be noted that any item of the hardware, the firmware, the specification, and the program is treated as the one of the same level whatever its kind may be. These items comprise a PROM, a firmware, a condenser, an integrated circuit (IC) and the like.

A child component drawing number for identification is attached to each of these child component drawings $CK_1$–$CK_X$. For example, the child component drawing $CK_X$ corresponds to a printed circuit board which is one of the main components of the server and a child component drawing number for identification of "CA20001-000X" is attached to the child component drawing $CK_X$.

In the n-th (third) layer, each of the child component drawings $D_{11}$–$D_{1X}$ is linked to the x-pieces of items in the child component drawing $CK_1$ and is a piece of specific information (a drawing, a firmware itself, a specification, and the like) related to x-pieces of items (a hardware part, a firmware, and the like). Likewise, each of the child component drawings $D_{21}$–$D_{2X}$ is linked to each of the x-pieces of items in the child component drawing $CK_2$ and is a piece of specific information (a drawing, a firmware itself, a specification, and the like) related to x-pieces of items (a hardware part, a firmware, and the like).

Each of the child component drawings $D_{X1}$–$D_{XX}$ is linked to each of the x-pieces of items in the child component drawing $CK_X$ and is a piece of specific information (a drawing, a firmware itself, a specification, and the like) related to x-pieces of items (a hardware part, a firmware, and the like). The child component drawing $D_{X1}$ is linked to a PROM (item) in the child component drawing $CK_X$ and is a specification related to the PROM: that is, the PROM is an item packaged in a printed circuit board which is one of the main components. A child component drawing number for identification of "CA41000-1000" is attached to the child component drawing $D_{X1}$.

Similarly, the child component drawing $D_{XX}$ is linked to a firmware (item) in the child component drawing $CK_X$ and is a firmware itself. The firmware is stored in the PROM described above and is treated as an item constituting a printed circuit board. A child component drawing number for identification of "CA41000-100X" is attached to the child component drawing $D_{XX}$. In this manner, the above-mentioned child component drawings $D_{11}$–$D_{1X}$, the child component drawings $D_{21}$–$D_{2X}$, and the child component drawings $D_{X1}$–$D_{XX}$ are slaved to the child component drawings $CK_1$–$CK_X$, respectively.

Information related to the hierarchical structure shown in FIG. 2 is stored as a meta-information file $F_1$ written in XML, as shown in FIG. 4, in the meta-block of the component data base DB1. FIG. 3 is an illustration of the meta-information. The meta-information SK shown in FIG. 3 corresponds to the child component drawing $D_{X1}$ (PROM: CA41000-1000) and the child component drawing $D_{XX}$ shown in FIG. 2 (firmware: CA41000-100x). The meta-information $SK_F$ is the detailed information of the child component drawing $D_{XX}$ (firmware: CA41000-100x) in the meta-information SK.

In the meta-information $SK_F$, the name of a file "H9CA41000-1000a.xml" in which the history of a firmware is written in XML is written in a line of "history". In a line of "ECO/NRN" is written the name of a file "E1CA41000-1000a.xml" in which a revised design notice (ECO) or a new design notice (NRN), which will be described below, are written in XML. In this connection, the contents in the other lines will be described below in detail.

In the meta-information file $F_1$ shown in FIG. 4, the content of a <COMPONENT NAME> tag is the name of a component (see FIG. 2: printed circuit board (PCB)). The content of a <COMPONENT NUMBER> tag is the child component number (CA20001-000X) of the child component drawing $CK_X$ shown in FIG. 2.

The content of a <PART NAME> tag is a PROM and a firmware constituting a PCB (see FIG. 2: child component drawings $D_{X1}$ and $D_{XX}$). The content of a <PART NUMBER> tag is the child component drawing numbers (CA41000-1000, CA41000-1000X) of the child component drawing $D_{X1}$ and $D_{XX}$. The content of a <WEB FILTER> tag will be described below. The content of a <COMPONENT MODULE> tag is the names of the files (CA20001-0000.ps, CA20001-0000.doc) of the components (design drawing of the PROM and the like). These files of CA20001-0000.ps and CA20001-0000.doc are stored in the data block of the component data base DB1.

Returning now to FIG. 1, an address data base DB2 is a data base including the electronic mail addresses of the reference-related client 30, the reception-related client 40, the object machine 50, client 60 to which development is consigned, and the vendor side client 70. A development consignment data base DB3 is a data base including various kinds of documents used for a development consignment processing described below. A part-catalog quotation permission data base DB4 is a data base including various kinds of documents used for a part quotation license processing described below. The address data base DB2, the development consignment data base DB3, and the part-catalog quotation permission data base DB4 will be described below in detail.

The reference-related client 30 is placed, for example, in a factory and refers to a component in the component data base DB1 via the network N by using a browser. The reception-related client 40 is placed, for example, in a factory, and receives a component from the component data base DB1 via the network N. The object machine 50 has both functions of the reference-related client 30 and the reception-related client 40 and is placed, for example, in a factory.

The client 60 to which development is consigned is placed in an external development maker and communicates with the management server 10 when the development consignment processing described below is performed. The vendor side client 70 is placed in a vendor supplying parts and communicates with the management server 10 when a part-catalog quotation permission processing is performed. The actions of the client 60 to which development is consigned and the vendor side client 70 will be described below in detail.

A registration-related processing in one preferred embodiment will be described with reference to a flow chart shown in FIG. 5. The registration-related processing is a processing of registering various kinds of information in the management server 10 by using the registration-related client 20. In this registration-related processing, the management server 10 monitors each event from step SA1 to step SA10 (a numbering processing, a registration processing, . . . , a part-catalog quotation permission processing).

Figure 7:
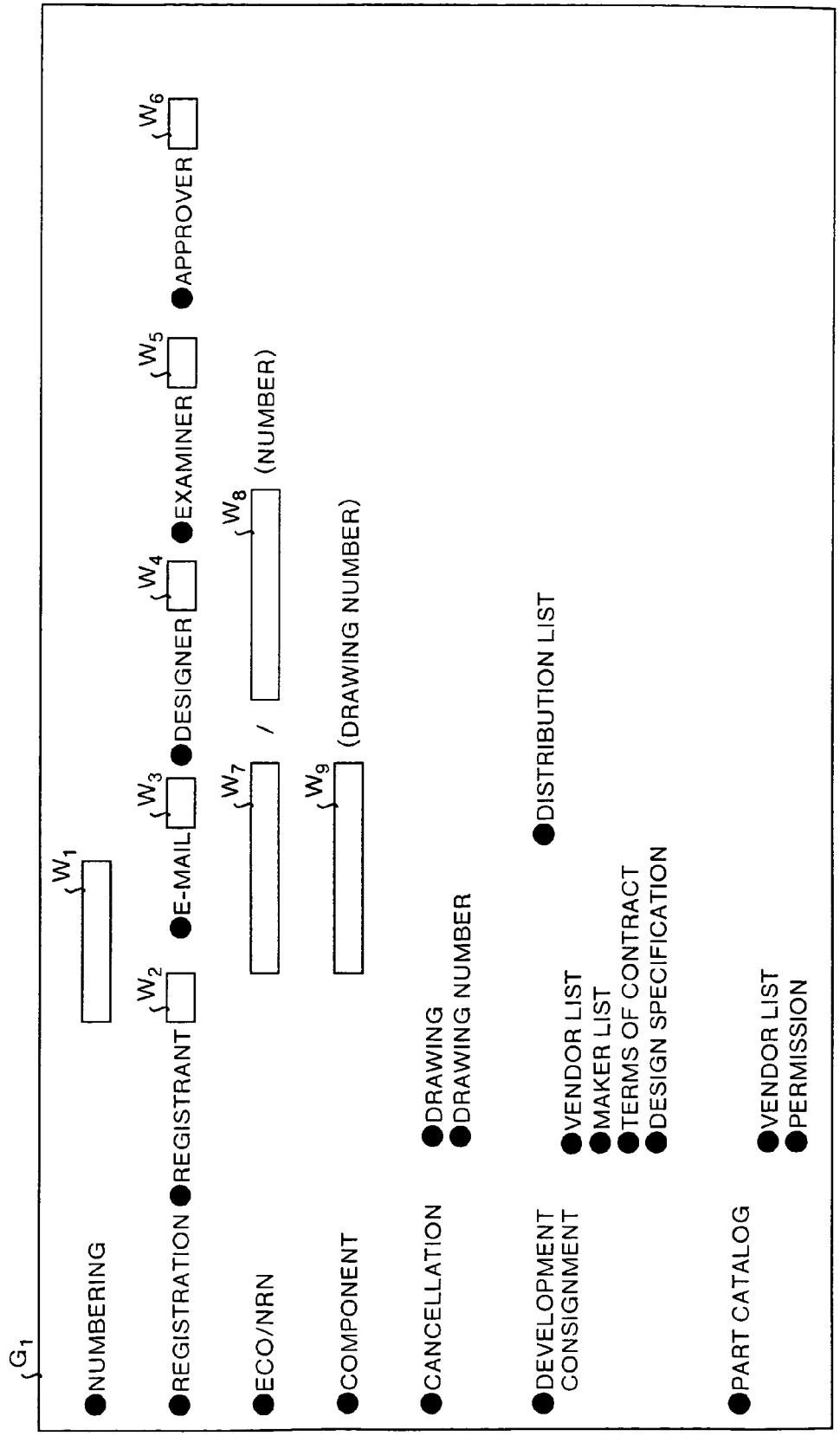
FIG. 7 is an illustration showing a registration-related screen $G_1$ in the preferred embodiment in accordance with the present invention.

When the browser of the registration-related client 20 is activated in a state where the registration-related client 20 is in access to the management server 10 via the network N in FIG. 1, a registration-related screen $G_1$ shown in FIG. 7 is displayed on the display 22 of the registration-related client 20. A registrant operating the registration-related client 20 enters information into a registrant information input box $W_2$, an electronic mail address box $W_3$, a designer information input box $W_4$, an inspector information input box $W_5$, and an approver information input box $W_6$ which are shown in FIG. 7.

In other words, into the registrant information input box $W_2$ are entered the name and post of the registrant, and into the electric mail address box $W_3$ is entered the electronic mail address of the registrant (where to make contact), and into the designer information input box $W_4$ are entered the name and post of the designer of the device/unit. Similarly, into the inspector information input box $W_5$ are entered the name and post of the inspector, and into the approver information input box $W_6$ are entered the name and post of the approver who is in a position of a responsible person.

Numbering Processing:—

Figure 5:
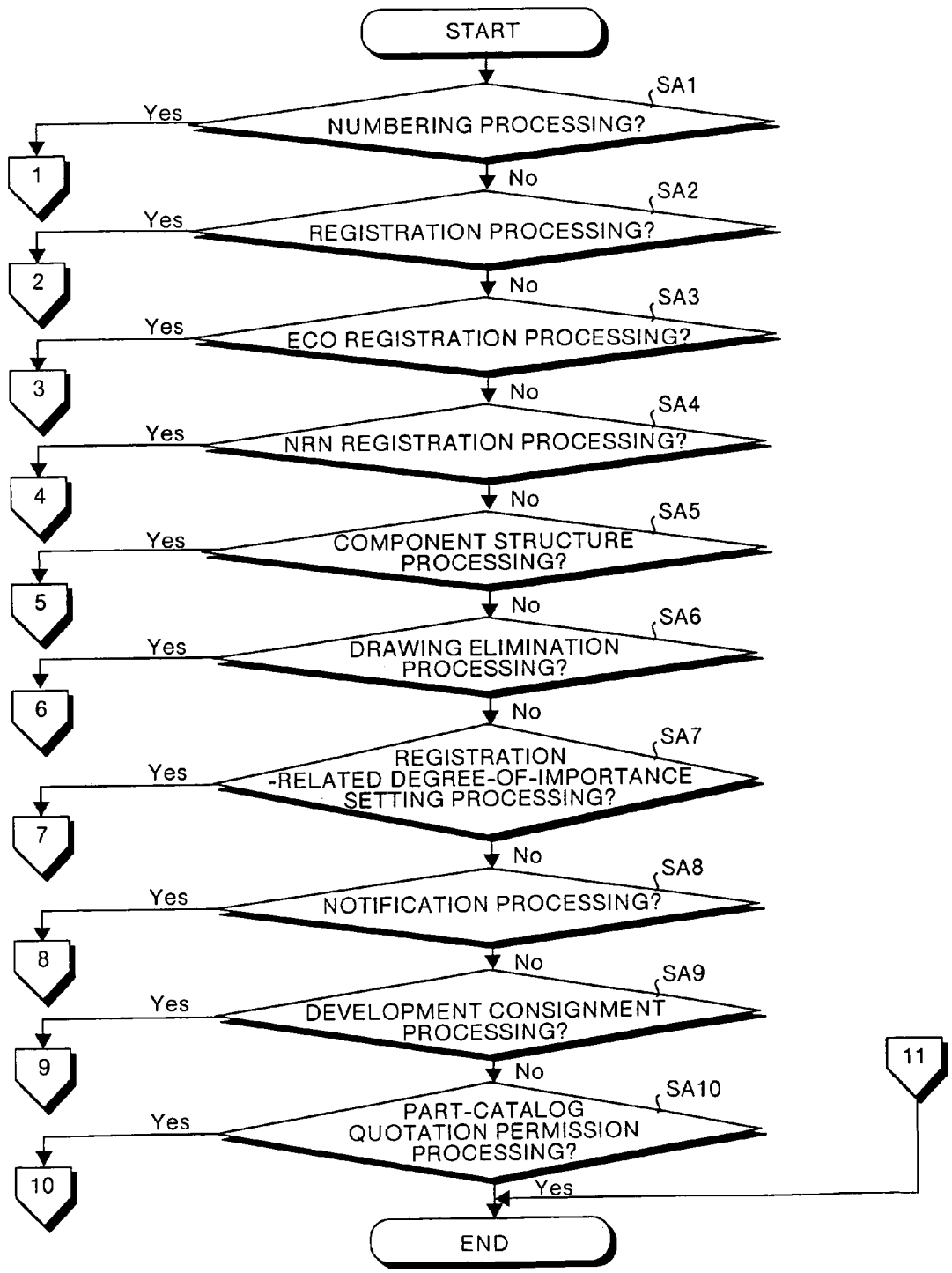
FIG. 5 is a flow chart describing a registration-related processing in the preferred embodiment in accordance with the present invention.
Figure 6:
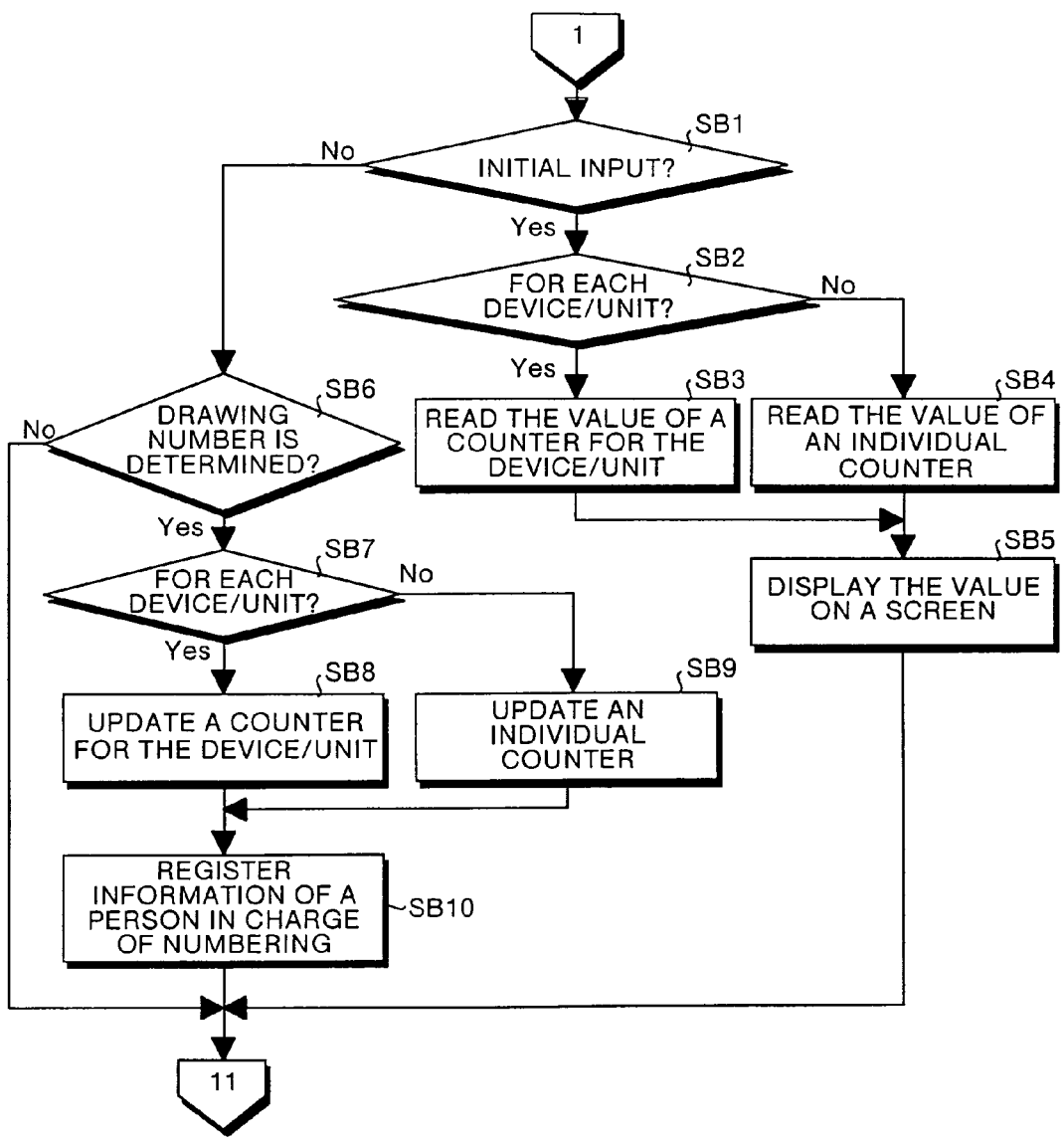
FIG. 6 is a flow chart describing a numbering processing in the preferred embodiment in accordance with the present invention.

When numbering processing is specified by the registrant in such a state, the event of the numbering processing occurs and, therefore, the management server 10 judges the result of determination at step SA1 shown in FIG. 5 to be YES and executes the numbering processing from step SB1 to step SB10 shown in FIG. 6. The numbering processing means the processing of getting parent (or child) component drawing numbers to register objects (a device, a hardware, a firmware, and the like) to be registered in the management server 10 as parent (or child) component drawings.

At the step SB1 shown in FIG. 6, the management server 10 judges whether the input is an initial input or not and, in this case, judges the result of determination at the step SB1 to be YES. At the step SB2, the management server 10 judges whether the numbering processing is performed for each the device/unit or not: that is, at the step SB2, the management server 10 judges whether the numbering processing is performed for the parent component drawing (see FIG. 2) or not. If the result of the judgment at the step SB2 is YES, the management server 10 proceeds to step SB3 and reads the value of a counter (not shown) for a device/unit. The counter for a device/unit is the one for realizing a numbering function.

At step SB5, for example, the parent component drawing number "CA20001-000" (see FIG. 2) is displayed as the value of the counter for a device/unit in the numbering display box $W_1$ shown in FIG. 7. The management server 10 returns to a main routine shown in FIG. 5 and judges the result of determination at the step SA1 to be YES and the step SB1 shown in FIG. 6 to be NO.

At step SB6, the management server 10 judges whether the parent component drawing number in the numbering display box $W_1$ (see FIG. 7) is determined or not, and, in this case, judges the result of determination at the step SB6 to be YES. In this connection, if the result of the judgment at the step SB6 is NO, the management server 10 finishes the numbering processing. At the step SB7, the management server 10 judges whether the numbering processing is performed for each device/unit or not, and in this case, judges the result of determination at the step SB7 to be YES.

At the step SB8, the management server 10 updates the counter for a device/unit (not shown) to set the value of the counter for a device/unit at a value for the next numbering processing. At the step SB10, the management server 10 registers the information of a person in charge of the numbering processing which is entered by the registration-related client 20 and then finishes a series of numbering processing. The information of a person in charge of the numbering processing comprises the post, name, electronic mail address of the person in charge of the numbering processing (designer or the like).

On the other hand, if the result of the judgment at the step SB2 is NO, in other words, when the numbering processing is performed for each unit other than the device/unit, the management server 10 proceeds to step SB4. The unit other than the device/unit comprises the ones other than the server which are shown in FIG. 2 (a printed circuit board, a PROM, and a firmware).

At the step SB4, the management server 10 reads the value of an individual counter (not shown). The individual counter is the one for realizing a numbering function as is the case with the counter of a device/unit. At step SB5, for example, the child component drawing number "CA20001-000X" (see FIG. 2) is displayed as the value of the individual counter in the numbering display box $W_1$. Thus, the management server 10 returns to the main routine shown in FIG. 5 and judges the result of determination at the step SA1 to be YES and judges the result of determination at the step SB1 shown in FIG. 6 to be NO.

At the step SB6, management server 10 judges whether the child component drawing number in the numbering display box $W_1$ (see FIG. 7) is determined or not, and, in this case, judges the result of determination at the step SB6 to be YES. At the step SB7, the management server 10 judges whether the numbering processing is performed for each device/unit or not, and in this case, judges the result of determination at the step SB7 to be NO.

At the step SB9, the management server 10 updates the individual counter (not shown) to set the value of the individual counter at the value of the next numbering processing. At the step SB10, in a like manner described above, the management server 10 registers the information of a person in charge of numbering processing which is entered by the registration-related client 20 and then finishes the numbering processing.

Registration Processing:—

Figure 8:
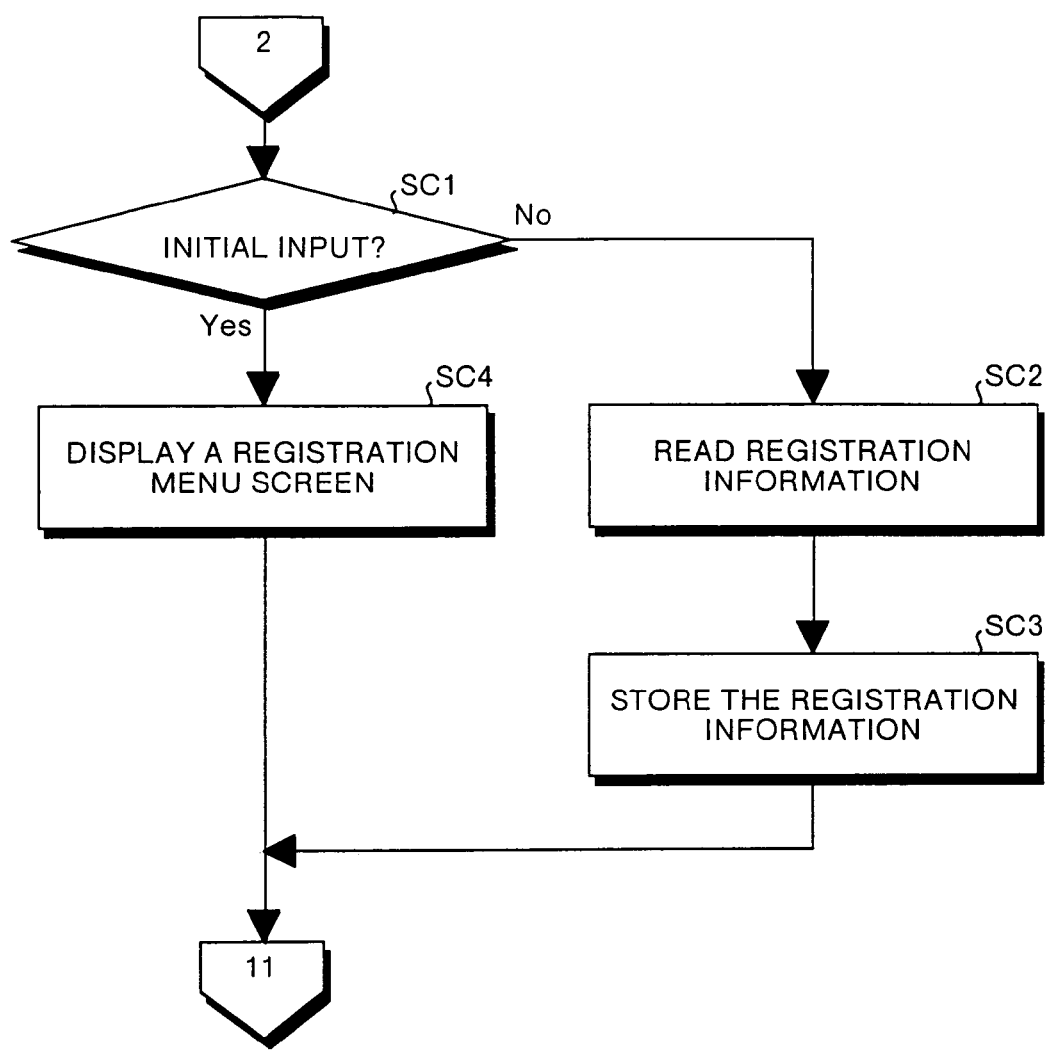
FIG. 8 is a flow chart describing a registration processing in the preferred embodiment in accordance with the present invention.

When registration processing is specified by a registrant, the event of the registration processing occurs and, therefore, the management server 10 judges the result of determination at the step SA2 shown in FIG. 5 to be YES and executes the registration processing from step SC1 to step SC4 shown in FIG. 8. In this registration processing, a processing of registering a plurality of components forming the hierarchical structure shown in FIG. 2 (a component part table, a logic circuit drawing, a structure drawing, a package drawing, and the like) is executed.

At the step SC1 shown in FIG. 8, the management server 10 judges whether the input is an initial input or not and, in this case, judges the result of determination at the step SC1 to be YES. At the step SC4, the management server 10 displays a registration menu screen $G_2$ shown in FIG. 9 on the display 22 of the registration-related client 20.

Figure 9:
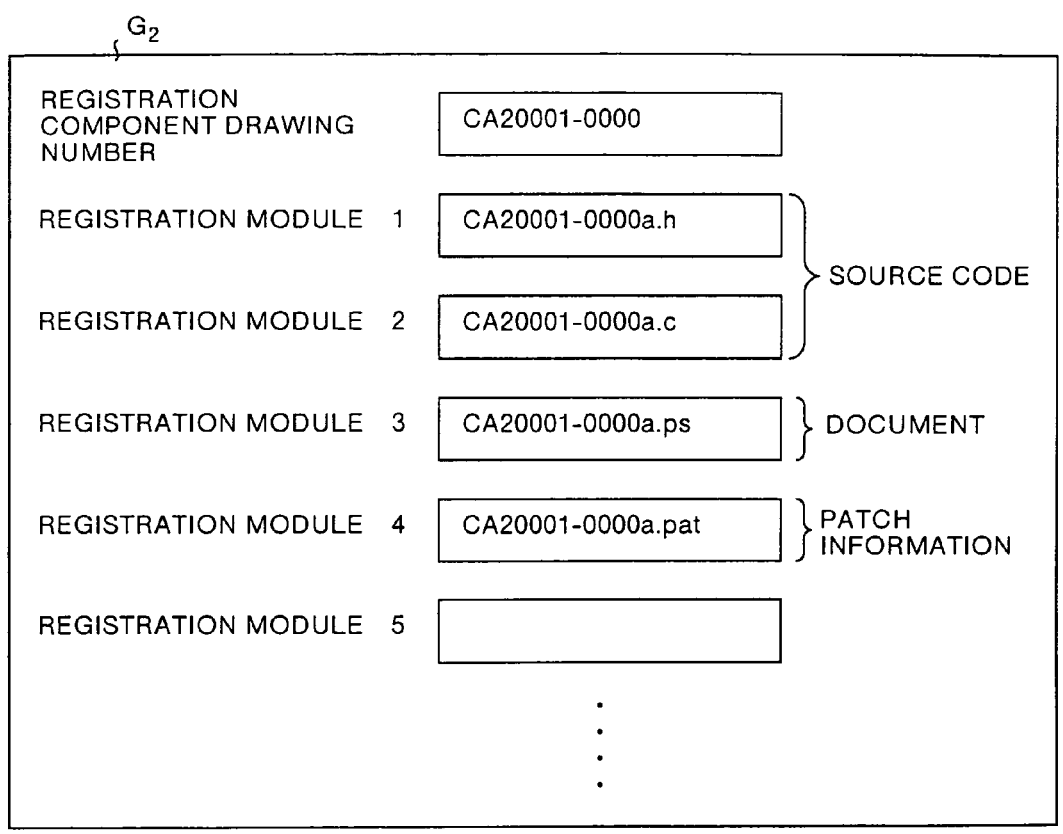
FIG. 9 is an illustration showing a registration menu screen $G_2$ in the preferred embodiment in accordance with the present invention.

The registrant enters registration information into an input box shown in FIG. 9. That is, the registrant enters, for example, the parent component drawing number "CA20001-0000" which is numbered at the step SA1 (see FIG. 5) into the input box of "registration component drawing number". The registrant enters, for example, the file name of a registration module "CA20001-0000a.h" into the input box of a "registration module 1" shown in FIG. 9. The above registration module comprises things constituting components such as the source code of a firmware, documents (a parent component drawing, a child component drawing, and various kinds of specifications), patch information, and the like. The above patch information means information used for correcting the firmware.

In the example shown in FIG. 9, the "CA20001-0000a.h" corresponding to the "registration module 1" is the file name attached to the source code of the firmware. The registrant sequentially enters the file names of "CA20001-0000a.c, CA20001-0000a.ps, CA20001-0000a.pat", and the like into the input boxes following a "registration module 2" shown in FIG. 9, respectively.

The "CA20001-0000a.c" corresponding to the "registration module 2" is the file name attached to the source code of the firmware and the "CA20001-0000a.ps" corresponding to a "registration module 3" is the file name attached to a document. Similarly, the "CA20001-0000a.pat" corresponding to a "registration module 4" is the file name attached to the patch information.

In this connection, the registration module shown in FIG. 9 such as the source code, the document, and the patch information is transferred in advance to the management server 10 via the network N from the registration-related client 20 before the registration processing, for example, according to a file transfer protocol (FTP). Further, the transferred registration module is stored in a predetermined directory in the component data base DB1.

When the management server 10 displays the registration menu screen $G_2$ in the step SC4 and the registrant finishes entering the registration information, the management server 10 returns to the main routine shown in FIG. 5 and judges the result of determination at the step SA2 to be YES and judges the result of determination at the step SC1 shown in FIG. 8 to be NO. At the step SC2, the management server 10 reads the registration information shown in FIG. 9 ("CA20001-0000, CA20001-0000a.h", and the like). At the step SC3, the management server 10 stores the registration information in the data block of the component data base DB1 and then returns to the main routine shown in FIG. 5.

ECO Registration Processing:—

Figure 10:
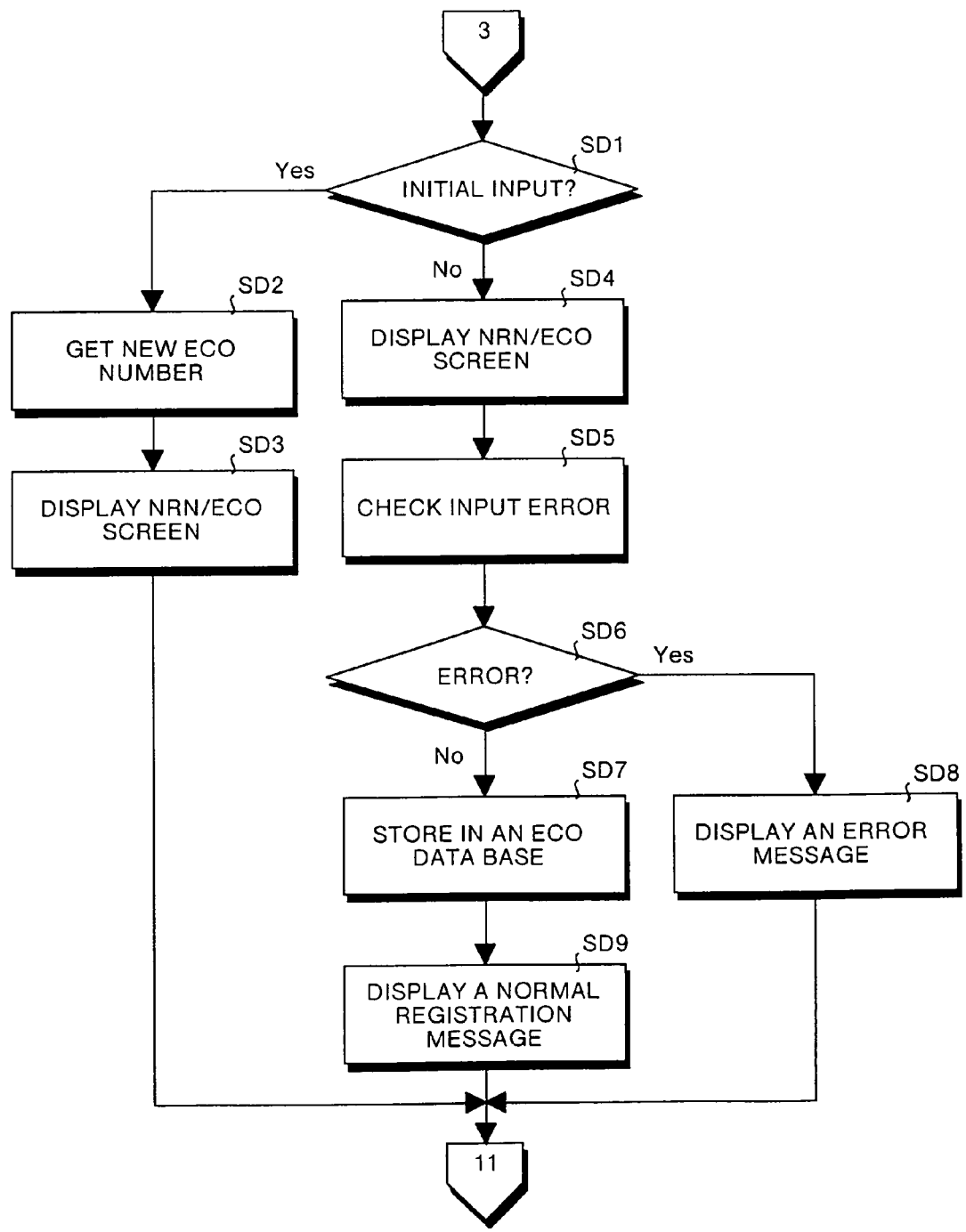
FIG. 10 is a flow chart describing an ECO registration processing in the preferred embodiment in accordance with the present invention.

When ECO registration processing is specified by the registrant with the registration client 20, the event of the ECO registration processing occurs and, therefore, the management server 10 judges the result of determination at the step SA3 to be YES and executes the ECO registration processing from step SD1 to step SD9 shown in FIG. 10. The ECO registration processing is executed when there occurs a revision in the component registered in the component data base DB1.

That is, at the step SD1 shown in FIG. 10, the management server 10 judges whether the input is an initial input or not and, in this case, judges the result of determination at the step SD1 to be YES. At the step SD2, the management server 10 gets a new ECO number (see "ECO/NRN number" shown in FIG. 11). The new ECO number is newly attached to the component when the component is revised to specify the revised component.

At the step SD3, the management server 10 displays an NRN/ECO input screen $G_3$ shown in FIG. 11 on the display 22 of the registration-related client 20 (see FIG. 1). The NRN/ECO input screen $G_3$ is the one made by electronizing a new/revised design notice and is used for creating a new design notice (NRN) or a revised design notice (ECO).

The new design notice (NRN) is used for notifying the reference-related client 30 and the reception-related client 40 which are placed in the factory shown in FIG. 1 that a component (a parent component drawing, a child component drawing, a firmware and the like) is newly registered in the component data base DB1. On the other hand, the revised design notice (ECO) is used for notifying the reference-related client 30 and the reception-related client 40 which are placed in the factory shown in FIG. 1 that there occurs a revision in a component already registered in the component data base DB1 and that a revised component is registered in the component data base DB1. In this case, since the ECO registration processing is executed, the NRN/ECO input screen $G_3$ is used for creating the revised design notice (ECO).

In the NRN/ECO input screen $G_3$, a position to which the new design notice (NRN) or the revised design notice (ECO) is sent is entered into the box of "where to send". The drawing number of a parent (or a child) component drawing, the version number of the parent (or child) drawing, a part name corresponding to the parent (or child) component drawing, and the name of a maker of the part are entered into the boxes of "drawing number", "version", "part name or model", and "maker", respectively. Detailed information related to the new design and the revised design are entered into the check boxes of "1. point of change", "2. reason of improvement", "3. phase of occurrence", "4. department of occurrence", and "5. cause of occurrence", respectively and a check mark is entered into each applicable check box.

When the management server 10 displays the NRN/ECO input screen $G_3$ on the display 22 of the registration-related client 20, the management server 10 returns to the main routine shown in FIG. 5 and judges the result of determination at the step SA3 to be YES and judges the result of determination at the step SD1 to be NO. At the step SD4, the management server 10 displays the NRN/ECO input screen $G_3$ shown in FIG. 11 on the display 22.

The registrant operates the registration-related client 20 to enter registration information relating to the revised design notice into the NRN/ECO input screen $G_3$. The above registration information comprises "name", "typical model name", "drawing number", "version", "part name or model", "maker", "notes", "where to send", "1. point of change", and the like.

When the registrant finishes entering the registration information, the management server 10 checks input errors related to the omission of an input or an improper input. At the step SD6, the management server 10 judges whether there is an error in checking the input errors or not and, if the result of the judgment is NO, proceeds to step SD7. In this connection, if the result of the judgment at the step SD6 is YES, the management server 10 proceeds to step SD8 and displays an error message of, for example, "input error" on a display 22 and then returns to the main routine shown in FIG. 5.

At the step SD7, the management server 10 stores information relating to the revised design notice (ECO) as an NRN/ECO file $F_2$ written in XML shown in FIG. 12 in an ECO data base (not shown) and then proceeds to step SD9. The above ECO data base is ensured in a partial region of the component data base DB1.

In FIG. 12, a <ECO/NRN> tag designates that the NRN/ECO file $F_2$ is a file related to the new design notice (NRN) or a file related to a revised design notice (ECO). To be more specific, if the NRN/ECO file $F_2$ is a file related to the new design notice (NRN), the content of the <ECO/NRN> tag is NRN. On the other hand, if the NRN/ECO file $F_2$ is a file related to a revised design notice (ECO), the content of the <ECO/NRN> tag is ECO.

A <where to distribute> tag designates a position to which the new design notice (NRN) or the revised design notice (ECO) is distributed and a <where to supply> tag designates a position to which a device/unit is supplied. A <reason of change> tag designates the reason of change associated with the new design or the revised design and is constituted by a<design error> tag, a<occurrence of problem> tag, a<solution of problem> tag, a<change of specification> tag, and a<change of standard> tag.

These tags of<design error>, <occurrence of problem>, <solution of problem>, <change of specification>, and <change of standard> designate the presence or absence of the reason of change associated with the new design or the revised design such as design error, occurrence of problem, solution of problem, change of specification, and change of standard. To be specific, when there is the reason of change, "1" is written in the tag corresponding to the reason, of the tags of <design error>, <occurrence of problem>, <solution of problem>, <change of specification>, and <change of standard>, and when there is no reason, "0" is written in the tag corresponding to the change of reason. FIG. 13 is an illustration showing the NRN/ECO screen $G_4$ if the NRN/ECO file $F_2$ shown in FIG. 12 is displayed on a display 32 or on a display 42 which will be described later.

At the step SD9 in FIG. 10, the management server 10 displays on the display 22 (see FIG. 1) a normal registration message to the effect that the revised design notice (ECO) is normally registered and then returns to the main routine shown in FIG. 5. On the other hand, if the result of judgment at the step SD6 is NO, the management server 10 proceeds to step SD8 and displays, for example, an error message of "input error" on the display 22 (see FIG. 1) and then returns to the main routine shown in FIG. 5.

NRN Registration Processing:—

Figure 14:
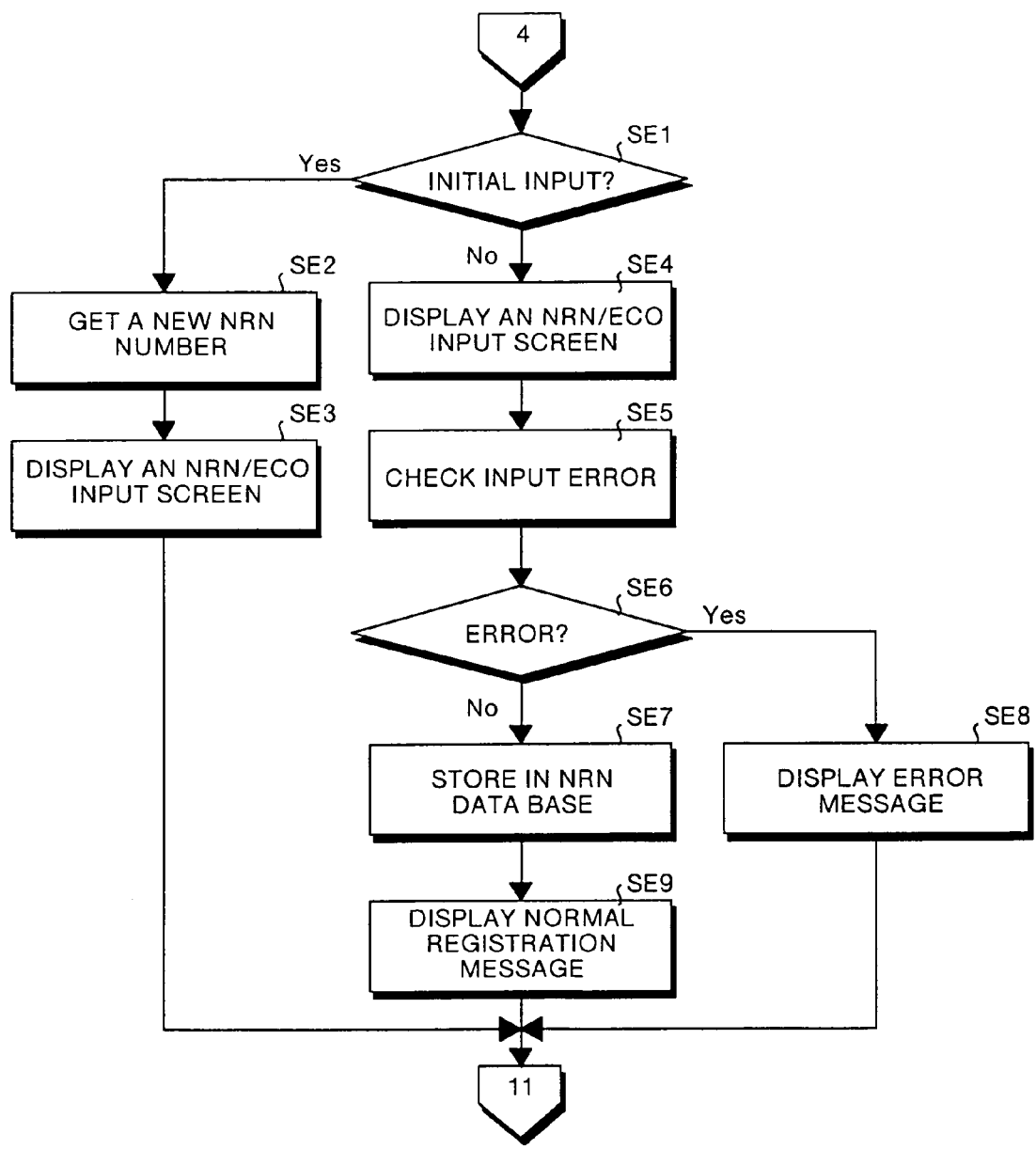
FIG. 14 is a flow chart describing an NRN registration processing in the preferred embodiment in accordance with the present invention.

When NRN registration processing is specified by the registrant with the registration-related client 20, the event of the NRN registration processing occurs and, therefore, the management server 10 judges the result of determination at the step SA4 shown in FIG. 5 to be YES and executes the NRN registration processing from step SE1 to step SE9 shown in FIG. 14. The above NRN registration processing is executed when a component to be newly registered in the component data base DB1 such as the new design drawing is generated.

That is, at the step SE1 shown in FIG. 14, the management server 10 judges whether the input is an initial input or not and, in this case, judges the result of determination at the step SE1 to be YES. At the step SE2, the management server 10 gets a new NRN number (see "ECO/NRN" number shown in FIG. 11). The new NRN number is the one assigned to a new component to specify the new component.

At the step SE3, the management server 10 displays the NRN/ECO input screen $G_3$ shown in FIG. 11 on the display 22 of the registration-related client 20 (see FIG. 1), as is the case with the step $SD_3$ (see FIG. 10) and then returns to the main routine shown in FIG. 5. In this case, the management server 10 judges the result of determination at the step SA4 to be YES and judges the result of determination at the step SE1 shown in FIG. 14 to be NO. At the step SE4, the management server 10 displays the NRN/ECO input screen $G_3$ shown FIG. 11 on the display 22 (see FIG. 1).

In this manner, the registrant operates the registration-related client 20 to enter registration information relating to the new design notice into the NRN/ECO input screen $G_3$ shown FIG. 11, as is the case with the above ECO registration processing. When the registrant finishes entering the registration information, the management server 10 makes an input error check related to the omission of an input or an improper input. At the step SE6, the management server 10 judges whether there is an error (input error) in making an input error check and, proceeds to step SE7 when the result of the judgment is NO.

At the step SE7, the management server 10 stores information relating to the new design notice (NRN) as the NRN/ECO file $F_2$ written in XML shown in FIG. 12 in an NRN data base (not shown) and then proceeds to step SE9. The NRN data base is ensured in a partial region of the component data base DB1. In this case, in the NRN/ECO file $F_2$ shown in FIG. 12, the content of the <ECO/NRN> tag is NRN.

At the step SE9 in FIG. 14, the management server 10 displays on a display 22 (see FIG. 1) a normal registration message to the effect that the new design notice (NRN) is normally registered and then returns to the main routine shown in FIG. 5. On the other hand, if the result of judgment in the step SE6 is NO, the management server 10 proceeds to step SE8 and displays, for example, an error message of "input error" on the display 22 (see FIG. 1) and then returns to the main routine shown in FIG. 5.

Component Structure Processing:—

Figure 15:
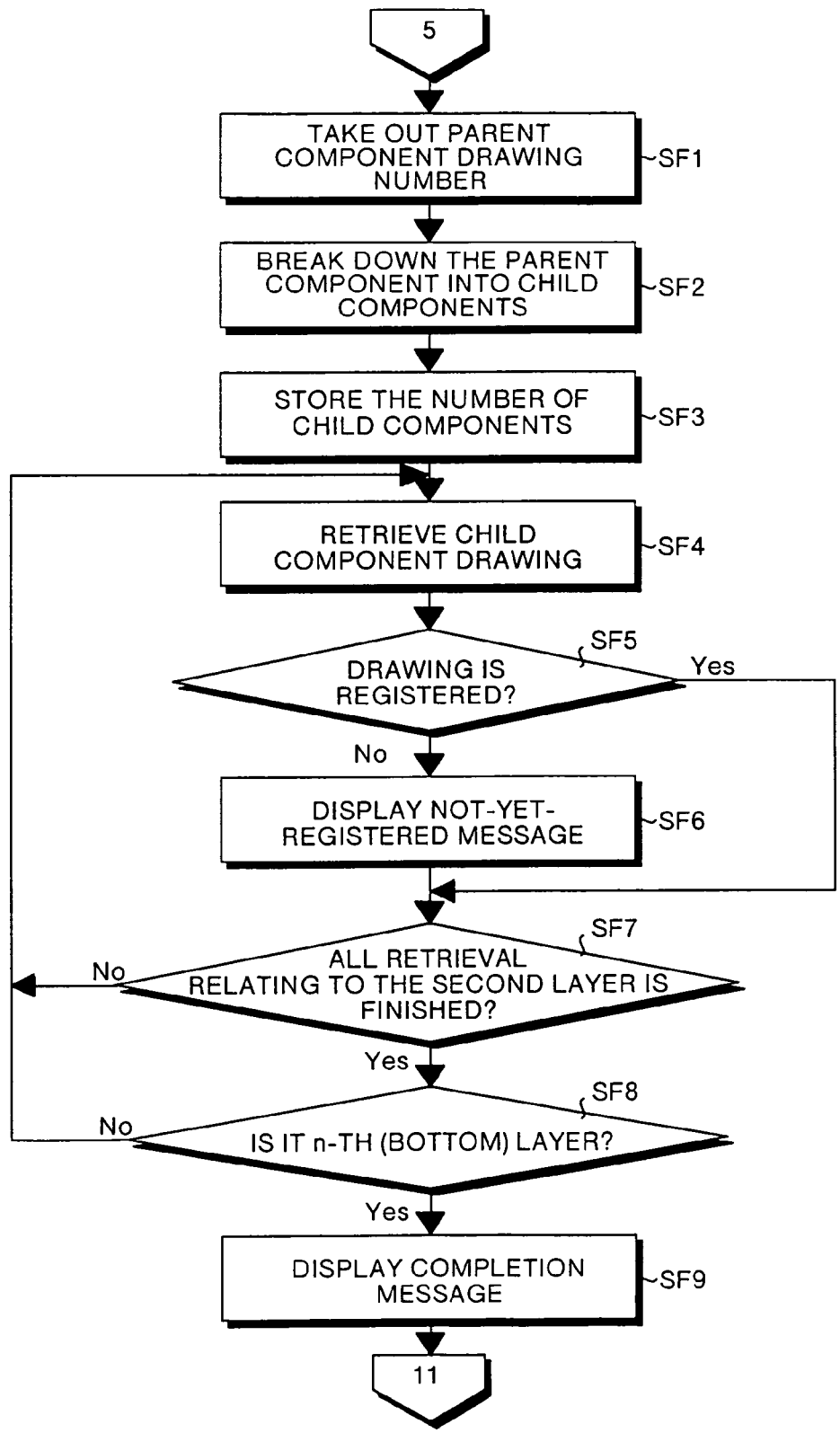
FIG. 15 is a flow chart describing a component structure processing in the preferred embodiment in accordance with the present invention.

When component structure processing is specified by the registrant with the registration-related client 20, the event of the component structure processing occurs and, therefore, the management server 10 judges the result of determination at the step SA5 shown in FIG. 5 to be YES and executes the component structure processing from step SF1 to step SF9 shown in FIG. 15. The component structure processing is the one for constituting the components registered in the registration processing (see FIG. 5 and FIG. 8) in a hierarchical structure as shown in FIG. 2.

In the data block of the component data base DB1 are registered the parent component drawing PK, the child component drawings $CK_1$ to $CK_X$, and the child component drawings $D_{11}$ to $D_{XX}$. In this case, at the step SF1 shown in FIG. 15, the management server 10 takes out the drawing number "CA20001-0000" of the parent component drawing PK from the component data base DB1. At the step SF2, the management server 10 breaks down the parent component drawing PK into the second layer child component drawings $CK_1$ to $CK_X$ and the third layer child component drawings $D_{11}$ to $D_{XX}$.

At the step SF3, the management server 10 stores the number of the child components, that is, the number of x of the child component drawings $CK_1$ to $CK_X$ in the component data base DB1 based on the parent component drawing PK. At the step SF4, the management server 10 retrieves the data block of the component data base DB1 (see FIG. 1) by using the child component drawing number of the child component drawing $CK_1$ of the second layer shown in FIG. 2 as a key.

At the step SF5, the management server 10 judges whether the child component drawing $CK_1$ is registered in the data block of the component data base DB1 based on the result of the retrieval at the step SF4. In this case, the management server 10 judges the result of determination at the step SF5 to be YES and proceeds to step SF7. In this connection, if the result of the judgment at the step SF5 is NO, the management server 10 proceeds to step SF6. At the step SF6, the management server 10 displays a not-yet-registered message of "a drawing corresponding to ** (child component drawing number) is not yet registered" on the display 22 (see FIG. 1**).

At the step SF7, the management server 10 judges whether all retrieval related to the second layer shown in FIG. 2 is finished or not. In this case, the management server 10 judges the result of determination at the step SF7 to be NO and returns to the step SF4. At the step SF4, the management server 10 retrieves the data block of the component data base DB1 (see FIG. 1) by using the child component drawing number of the next child component drawing $CK_2$ of the second layer shown in FIG. 2 as a key and then proceeds to the step SF5. Thereafter, the management server 10 repeats the above-mentioned actions until the result of the judgment at the step SF7 becomes YES.

When the management server 10 finishes retrieving the child component drawing $CK_X$ of the second layer shown in FIG. 2, the management server 10 judges the result of determination at the step SF7 to be YES. At the step SF8, the management server 10 judges whether all retrieval relating to the n-th layer (bottom layer) shown in FIG. 2 is finished or not. In this case, the management server 10 judges the result of determination at the step SF8 to be NO and returns to the step SF4. Thereafter, following the step SF4, the management server 10 retrieves the child component drawings $D_{11}$ to $D_{XX}$ of the n-th layer shown in FIG. 2, as is the case with the second layer.

When the management server 10 finishes retrieving the child component drawings $D_{XX}$ of the n-th layer shown in FIG. 2, the management server 10 judges the result of determination at the step SF8 to be YES. In this manner, as shown in FIG. 2, the parent component drawing PK, the child component drawings $CK_1$ to $CK_X$ and the child component drawings $D_{11}$ to $D_{XX}$ are made into a hierarchical structure. At the step SF9, the management server 10 displays a completion message of, for example, "a component structure processing is completed" on the display 22 (see FIG. 1), then it goes back to the main routine shown in FIG. 5.

Drawing Elimination Processing:—

Figure 16:
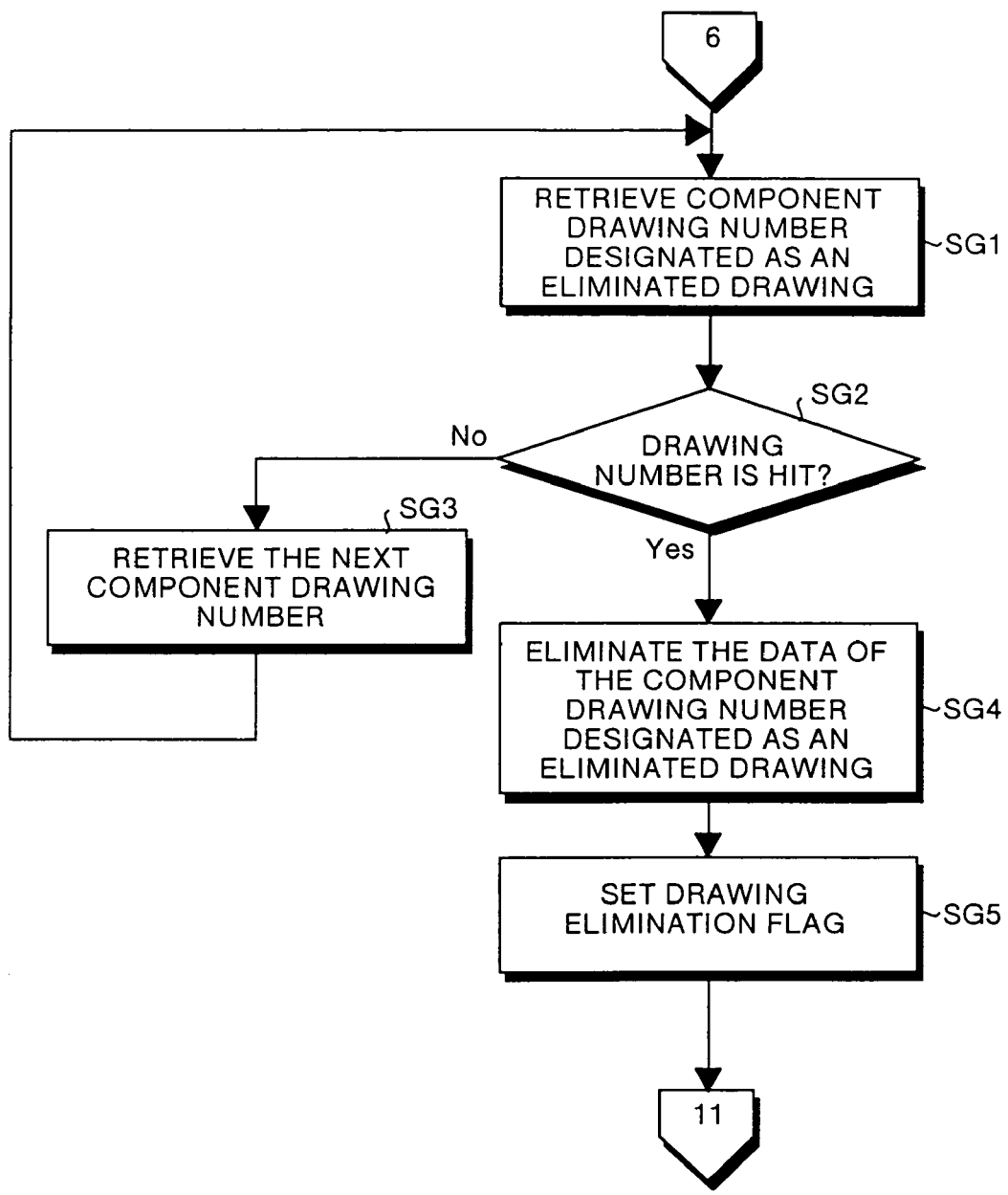
FIG. 16 is a flow chart describing a drawing elimination processing in the preferred embodiment in accordance with the present invention.

When drawing elimination processing is specified by the registrant with the registration-related client 20, the event of the drawing elimination processing occurs and, therefore, the management server 10 judges the result of determination at the step SA6 shown in FIG. 5 to be YES and executes the drawing elimination processing from step SG1 to step SG5 shown in FIG. 16. The drawing elimination processing is the processing of eliminating a component (a design drawing, a firmware) already registered in the data block of the component data base DB1 (see FIG. 1).

That is, when a component drawing number corresponding to a component to be eliminated is specified by the registrant with the registration-related client 20, the management server 10 proceeds to step SG1 shown in FIG. 16. For example, when the child component drawing number "CA41000-100X" of the child component drawing $D_{XX}$ shown in FIG. 2 is specified by the registrant, the management server 10 retrieves the component drawing number in the data block of the component data base DB1 by using the above-mentioned child component drawing number "CA41000-100X"as a key.

At the step SG2, the management server 10 judges whether the result of the retrieval at the step SG1 is a hit or not and if the result of the judgment is NO, the management server 10 proceeds to step SG3. In the step SG3, the management server 10 starts retrieving the next component drawing number in the data block of the component data base DB1 and then returns to the step SG1 and repeats the above-mentioned retrieval action.

When there is the child component drawing number "CA41000-100X" designated as an eliminated drawing in the data block of the component data base DB1, the management server 10 judges the result of determination at the step SG2 to be YES. At the step SG4, the management server 10 eliminates the data of the child component drawing number designated as the eliminated drawing, that is, the component drawing $D_{XX}$ to which the drawing number "CA41000-100X" is assigned (see FIG. 2) from the data block of the component data base DB1.

At the step SG5, the management server 10 writes a <elimination of drawing> tag in a meta-information file $F_1$ stored in the meta-block of the component data base DB1 (see FIG. 4) and then returns to the main routine shown in FIG. 5. To be specific, the management server 10 writes "1" in the <elimination of drawing> tag in XML.

Registration-Related Degree-of-Importance Setting Processing:—

Figure 17:
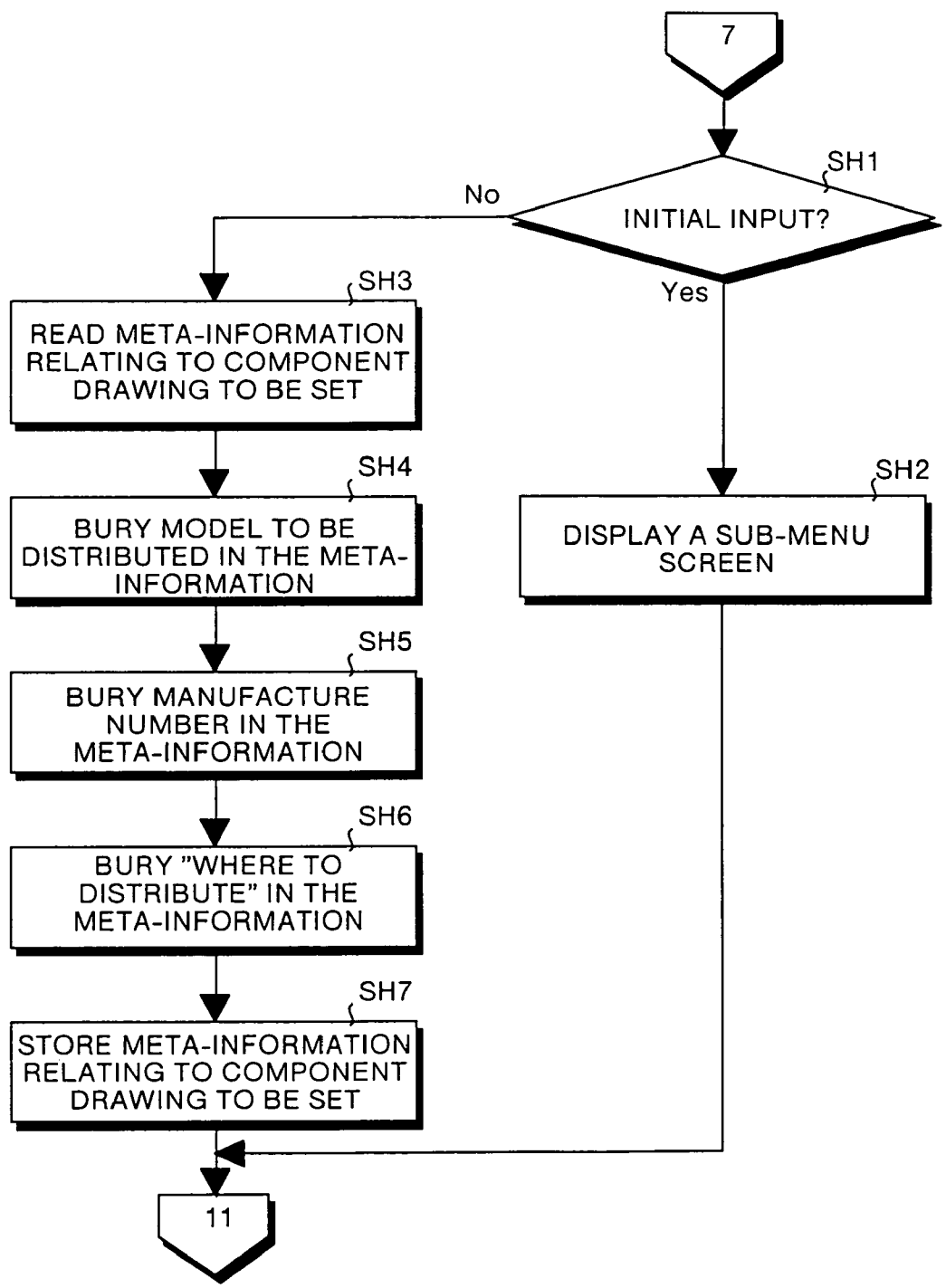
FIG. 17 is a flow chart describing a registration-related degree-of-importance setting processing in the preferred embodiment in accordance with the present invention.

When registration-related degree-of-importance setting processing is specified by the registrant with the registration-related client 20, the event of the registration-related degree-of-importance setting processing occurs and, therefore, the management server 10 judges the result of determination at the step SA7 shown in FIG. 5 to be YES and executes the registration-related degree-of-importance setting processing from step SH1 to step SH7 shown in FIG. 17.

That is, at the step SH1 shown in FIG. 17, the management server 10 judges whether the input is an initial input or not and, in this case, judges the result of determination at the step SH1 to be YES. At the step SH2, the management server 10 displays a sub-menu screen $G_5$ shown in FIG. 18 on the display 22 (see FIG. 1) and then returns to the main routine shown in FIG. 5. In this manner, the registrant enters data into the input box of "model to be distributed", the input box of "manufacture number to be distributed", and the input box of "where to distribute" in the sub-menu screen $G_5$ shown in FIG. 18, respectively.

In this case, "X8777S", "X8777D", and "X8777Z" are entered into the input boxes of "model to be distributed" as the model names of devices/units, respectively. The numbers of "00100" to "01233" are entered into the input boxes of "manufacture number to be distributed" as the manufacture numbers of the devices/units, respectively. The mark "*" and "ABC Co. LTD" are entered into the input boxes of "where to distribute", respectively.

"Where to distribute" means the name of a company or a department where a component (a design drawing, a firmware, and the like) is distributed. When the mark "*" is entered, the component is distributed to all the companies and departments other than "ABC Co. LTD". That is, if the mark "*" is entered, only "ABC Co. LTD" is excluded from the place where the components are distributed.

On the other hand, if the mark "*" is not entered, only "ABC Co. LTD" is the place where the component is distributed. The registrant enters a component drawing number corresponding to a component to be set by using the registration-related client 20. In this case, the registrant enters the child component drawing number "CA 20001-000X1" of the child component drawing $CK_X$ shown in FIG. 2 with the registration-related client 20.

When the registrant finishes entering the data, the management server 10 judges the result of determination at the step SA7 shown in FIG. 5 to be YES and the step SH1 shown in FIG. 17 to be NO. At the step SH3, the management server 10 reads a meta-information file related to a component drawing corresponding to a component drawing number entered by the registrant from the meta-block of the component data base DB1.

In this case, since the component drawing number "CA20001-000X" shown in FIG. 2 is entered by the registrant, the management server 10 reads the meta-information file $F_1$ shown in FIG. 4 and then proceeds to step SH4. In this connection, the <WEB FILTER> tag shown in FIG. 4 and its content are not buried in the meta-information file $F_1$ at this time.

At the step SH4, the management server 10 buries the "model to be distributed" (="X8777S", "X8777D", and "X8777Z") shown in FIG. 18 in the meta-information file $F_1$ shown in FIG. 4. To be specific, the management server 10 writes the <WEB FILTER> tag and the <MODEL> tag shown in FIG. 4 and then writes "X8777S", "X8777D", and "X8777Z" as the contents of the <MODEL> tag.

At the step SH5, the management server 10 buries "manufacture number to be distributed" (="00100" to "012333") shown in FIG. 18 in the meta-information file $F_1$ shown in FIG. 4. To be specific, the management server 10 writes a tag of <SERIAL NO> in the <WEB FILTER> tag shown in FIG. 4 and writes "00100" to "01233" as the content of the <SERIAL NO> tag.

At the step SH6, the management server 10 buries "where to distribute" (="*" and "ABC Co. LTD") shown in FIG. 18 in the meta-information file $F_1$ shown in FIG. 4. To be specific, the management server 10 writes a <USER> tag in the <WEB FILTER> tag shown in FIG. 4 and then writes "ABC Co. LTD" as the content of the <USER> tag. At the step SH7, the management server 10 stores the meta-information file $F_1$ in which the above-mentioned "model to be distributed", "manufacture number to be distributed", and "where to distribute" are buried in the meta-block of the component data base DB1 and then returns to the main routine shown in FIG. 5.

Notification Processing:—

Figure 19:
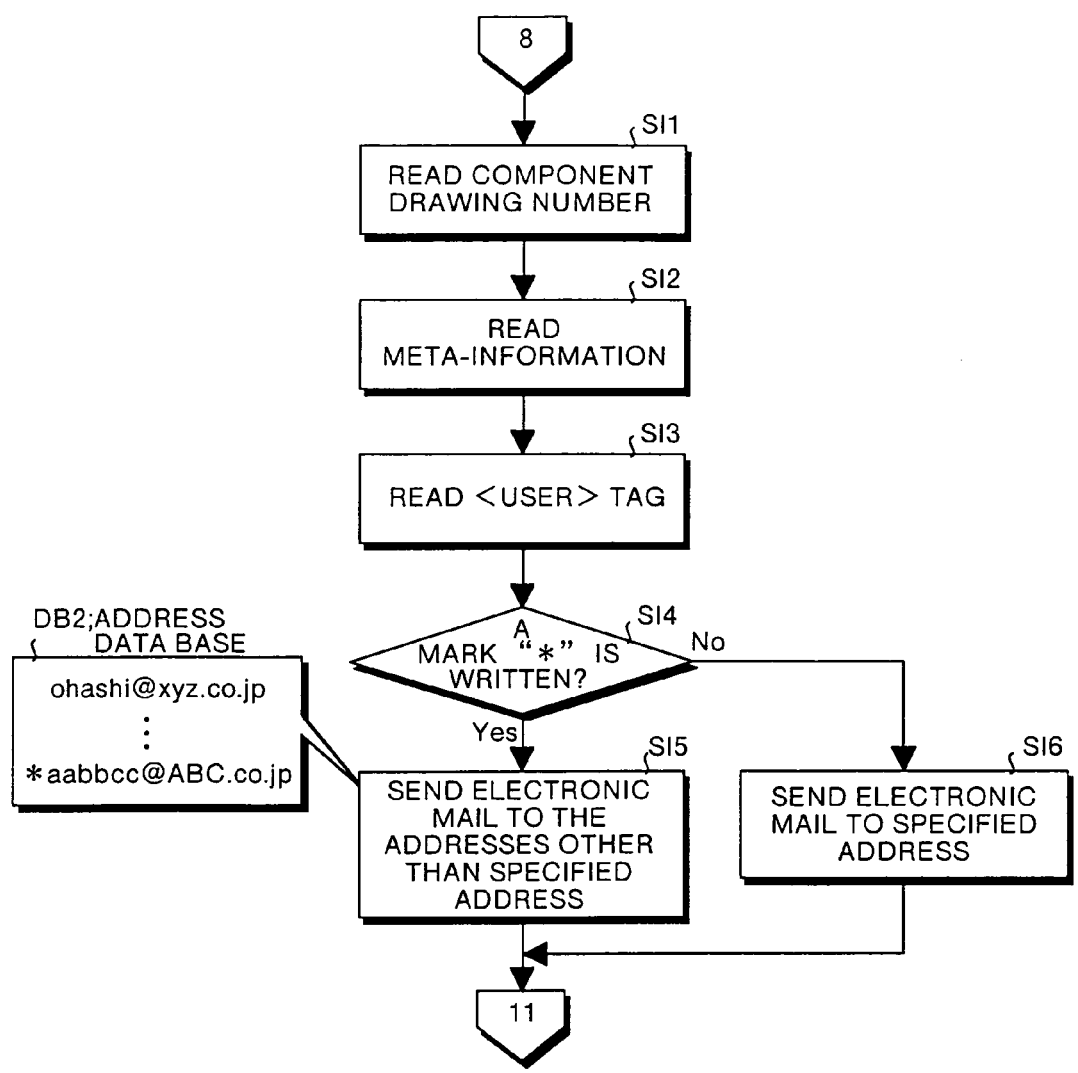
FIG. 19 is a flow chart describing a notification processing in the preferred embodiment in accordance with the present invention.

When notification processing is specified by the registrant with the registration-related client 20 after the completion of the ECO registration processing (or the NRN registration processing), the component structure processing, and the registration-related degree-of-importance setting processing are finished, the event of the notification processing occurs and, therefore, the management server 10 judges the result of determination at the step SA8 shown in FIG. 5 to be YES and executes the notification processing from step SI1 to step SI6 shown in FIG. 19.

The notification processing is the processing of notifying the reference-related client 30 and the reception-related client 40 that the ECO registration processing or the NRN registration has been finished, in other words, that the revised design notice (ECO) or the new design notice (NRN) shown in FIG. 11 has been issued.

That is, at the step SI1 shown in FIG. 19, the management server 10 reads a component drawing number registered by the ECO registration processing (or the NRN registration processing) from the component data base DB1. In this case, the management server 10 reads the child component drawing number "CA20001-000X" of the child component drawing $CK_X$ shown in FIG. 2.

At the step SI2, the management server 10 reads the meta-information file $F_1$ corresponding to the child component drawing number "CA20001-000X and shown in FIG. 4 from the meta-block of the component data base DB1. At the step SI3, the management server 10 reads the <USER> tag in the meta-information file $F_1$ shown in FIG. 4 and then proceeds to the step SI3. In this case, the content of the <USER> tag is "* ABC Co. LTD" which is "where to distribute" (see FIG. 18) set by the above-mentioned registration-related degree-of-importance setting processing.

At the step SI4, the management server 10 judges whether there is the mark "*" in the content of the <USER> tag read at the step SI3 or not and, in this case, judges the result of determination at the step SI3 to be YES. At the step SI5, the management server 10 sends an electronic mail to all addresses other than the specified address corresponding to "ABC Co. LTD" which is "where to distribute".

The electronic mail is sent to notify the client that the ECO registration processing (or the NRN registration processing) has been performed. In this case, if the address of "aabbcc@ABC.co.jp" to which the mark "*" is attached in the address data base DB2 is the address of a client (not shown) placed in "ABC Co. LTD", the management server 10 sends an electronic mail to all addresses other than the address of aabbcc@ABC.co.jp" in the address data base DB2.

To be specific, the management server 10 sends an electronic mail $E_{30}$ and an electronic mail $E_{40}$ to the address of the reference-related client 30 and the address of the reception-related client 40 via the network N and then returns to the main routine. However, the address of the reference-related client 30 and the address of the reception-related client 40 are the addresses other than the specified address of "aabbcc@ABC.co.jp". In this connection, a processing when the reference client 30 and the receipt client 40 receive the electronic mail $E_{30}$ and the electronic mail $E_{40}$ will be described below with reference to flow chart shown in FIG. 23.

In the case where the content of the <USER> tag shown in FIG. 4 is, for example, "ABC Co. LTD", that is, there is no mark "*" in the content of the <USER> tag, the management server 10 judges the result of determination at the step S14 to be NO. At the step SI6, the management server 10 sends an electronic mail to a specified address of "aabbcc@ABC.co.jp" corresponding to "ABC Co. LTD" and then returns to the main routine shown in FIG. 5. In this manner, it is notified only a client placed in "ABC Co. LTD" by the above-mentioned electronic mail that the ECO registration processing (or the NRN registration processing) has been performed.

Development Consignment Processing:—

Figure 20:
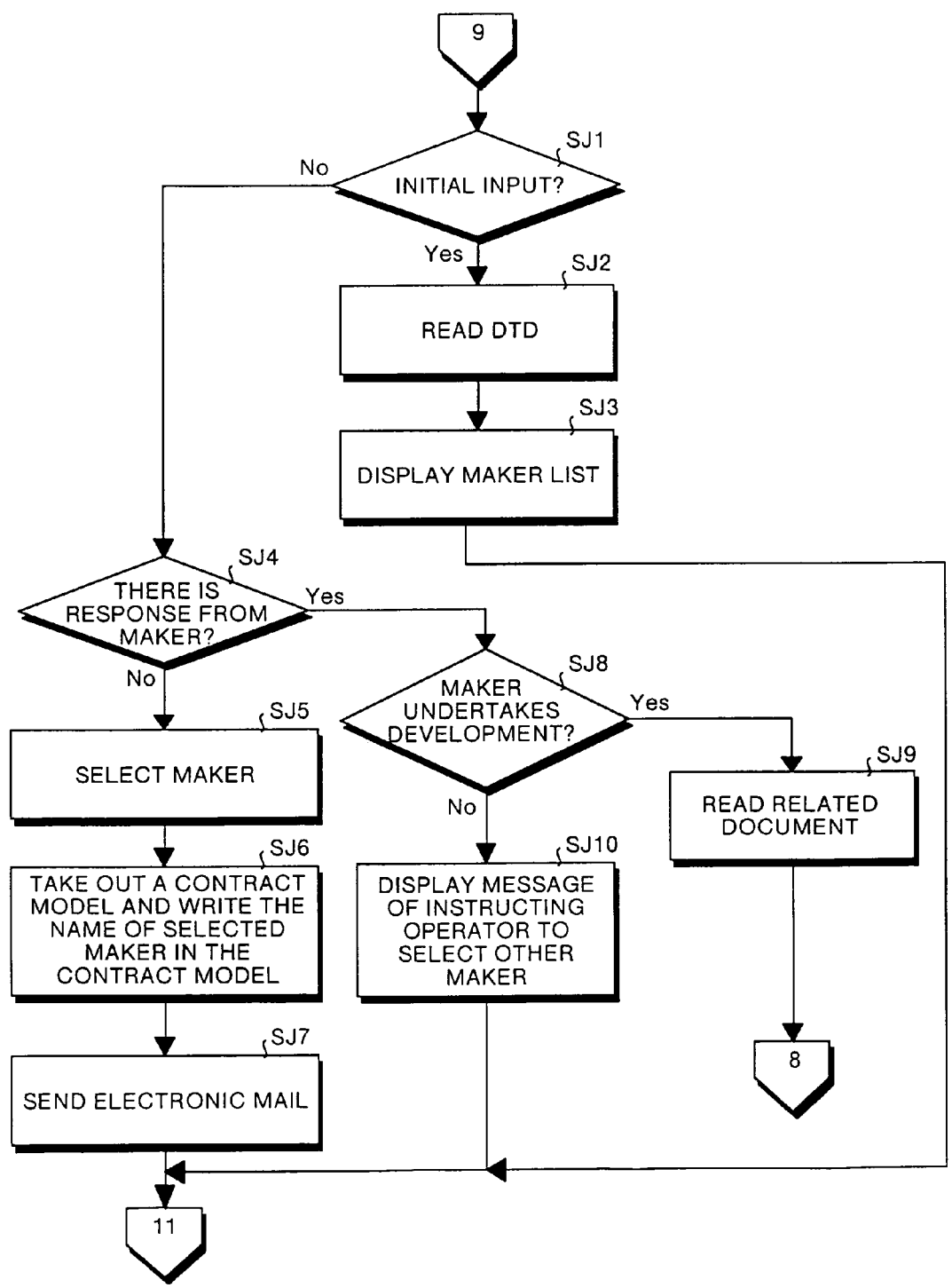
FIG. 20 is a flow chart describing a development consignment processing in the preferred embodiment in accordance with the present invention.

When development consignment processing is specified by the registrant with the registration-related client 20, the event of the development consignment processing occurs and, therefore, the management server 10 judges the result of determination at the step SA9 shown in FIG. 5 to be YES and executes the development consignment processing from step SJ1 to step SJ10 shown in FIG. 20. The development consignment processing is the processing of consigning a part of (or all of) product development to an external development maker.

At the step SJ1 shown in FIG. 20, the management server 10 judges whether the input is an initial input or not and, in this case, judges the result of determination at the step SJ1 to be YES. At the step SJ2, the management server 10 reads a document type definition (DTD) from a development consignment data base DB3 and then proceeds to step SJ3. The DTD defines a tag in a file written in XML.

At the step SJ3, the management server 10 reads a maker list file written in XML from the development consignment data base DB3 and interprets the tag from the DTD and then displays the maker list on the display 22. The maker list (not shown) is a list including the name, the electronic address, and the telephone number of the external development makers. In this manner, the registrant operates the registration-related client 20 to select one development maker from the maker list as a candidate for the development maker to which the development is consigned. The management server 10 returns to the main routine shown in FIG. 5 and judges the result of determination at the step SA9 to be YES and the step SJ1 shown in FIG. 20 to be NO.

At the step SJ4, the management server 10 judges whether there is a response from the development maker or not. The response means that the development maker undertakes the development or not. In this case, since the development is not yet consigned, the management server 10 judges the result of determination at the step SJ4 to be NO. At the step SJ5, the management server 10 reads the information of the development maker selected from the maker list by the registrant.

At the step SJ6, the management server 10 takes out the information of a contract model related to the development consignment (not shown) from the development consignment data base DB3 and then enters the name of the development maker into the contract model and then proceeds to step SJ7. The contract model is a document describing the terms of a contract or a contract document related to the development consignment and comprises, for example, a sentence of "* company shall keep confidential technical information disclosed or supplied thereto by OOO company. In the portion of "* company" is entered the name of the selected development maker. In this manner, a document describing the terms of a contract or a contract document related to the development consignment is made.

At the step SJ7, the management server 10 sends an electronic mail, for example, to the address of the client 60 and which is placed in a selected development maker and to which development is consigned and then returns to the main routine shown in FIG. 5. The content of the electronic mail is to consign development. To be specific, the management server 10 sends an electronic mail $E_{60A}$ to the address of the client 60 to which development is consigned via the network N. The management server 10 judges the result of determination at step SA9 shown in FIG. 5 to be YES and step SJ1 to be NO. At the step SJ4, the management server 10 judges whether there is a response relating to a development consignment from a development maker or not.

When the electronic mail $E_{60A}$ is received by the client 60 to which development is consigned, the development maker determines whether it undertakes the development or not and sends the determination to the management server 10 as an electronic mail $E_{60B}$ via the network N. In the case the development maker undertakes the development, the content of the electronic mail $E_{60B}$ is, for example, "*** company undertakes the development of OOO". When the electronic mail $E_{60B}$ is received, the management server 10 judges the result of determination at the step SJ4 to be YES. At the step SJ8, the management server 10 judges whether the development maker undertakes the development or not based on the content of the electronic mail $E_{60B}$ and, in the case where the development maker undertakes the development, judges the result of determination at the step SJ8 to be YES.

At the step SJ9, the management server 10 reads related documents such as a document of the terms of contract and a contract document and then proceeds to step SI1 shown in FIG. 19. At the step SI1, the management server 10 reads a component drawing number the development of which is to be consigned to the development maker from the component data base DB1.

At the step SI2, the management server 10 reads a meta-information file corresponding to the component drawing number from the meta-block of the component data base DB1 and then skips step SI3 and step SI4. At the step SI6, the management server 10 sends the related documents (the document of the terms of contract and the contract document) read in the step SJ9 and the component corresponding to the meta-information (design drawing, firmware and the like) with the electronic mail $E_{60A}$ to the client 60 to which development is consigned via the network N.

In this manner, the development maker develops the component the development of which is consigned based on the document of the terms of contract and the contract document. When the development maker completes the development, the development maker sends the developed component (firmware and the like) to the management server 10 from the client 60 to which development is consigned to electronically deliver the product. In this connection, it is also recommended in a preferred embodiment that the product be electronically delivered via a recording medium in which the component is recorded.

On the other hand, if the result of judgment at the step SJ8 shown in FIG. 20 is NO, that is, in the case where the development maker which is required to undertake the development does not undertake the development the management server 10 proceeds to step SJ10. At the step SJ10, the management server 10 displays on the display 22 a message of instructing the operator to select other development maker and then returns to the main routine shown in FIG. 5. In this manner, the registrant selects the other development maker from a maker list (see the step SJ3). Thereafter, as described above, a series of processing relating to the other selected development maker are performed.

Part-Catalog Quotation Permission Processing:—

Figure 21:
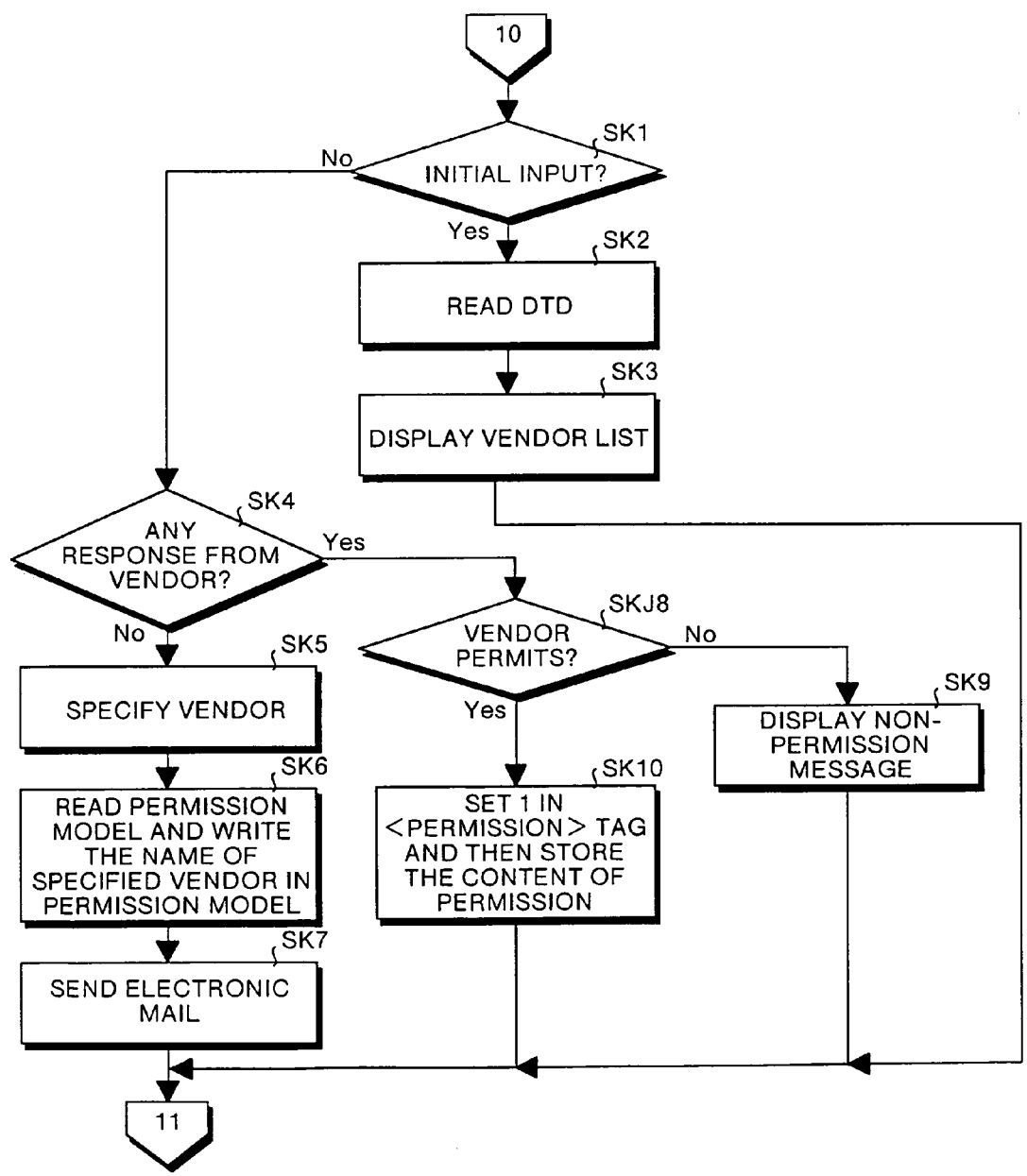
FIG. 21 is an illustration describing a part-catalog quotation permission processing in the preferred embodiment in accordance with the present invention.

When part-catalog quotation permission processing is specified by the registrant with the registration-related client 20, the event of the part-catalog quotation permission processing occurs and therefore the management server 10 judges the result of determination at the step SA10 shown in FIG. 5 to be YES and executes the part-catalog quotation permission processing from step SK1 to SK10 shown in FIG. 21.

Figure 22:
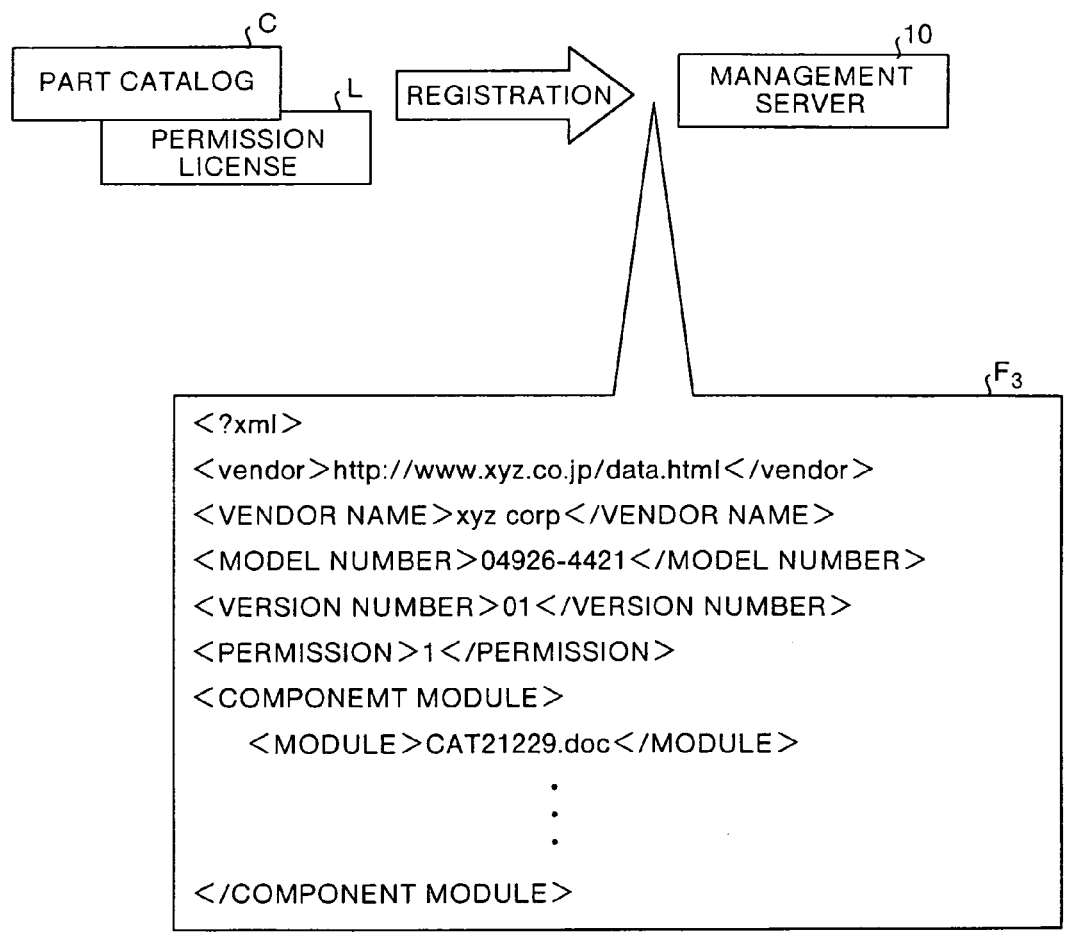
FIG. 22 is a flow chart describing a part-catalog quotation permission processing in the preferred embodiment in accordance with the present invention.

The part-catalog quotation permission processing is the processing of registering information relating to a part catalog C and a permission license L shown in FIG. 22 as a part-catalog information file $F_3$ in a part-catalog quotation permission data base DB4 (see FIG. 1) after the permission of a vendor making the part catalog C is obtained and managing it by the management server 10.

The part catalog C is a catalog related to parts necessary for the manufacture of the device/unit (hardware parts and firmware) and is stored in the vendor side client 70 as a data base. In this connection, the part catalog C is sometimes supplied as a paper medium to the maker from the vendor. The permission license L is permission information to the effect that the part catalog C the copy right of which is owned by the vendor is permitted to be quoted in the part-catalog quotation permission data base DB4 of the management server 10. The part-catalog information file $F_3$ describes the information of the part catalog C and the permission license L in XML.

In the part-catalog information file $F_3$, the content of a <vendor> tag is the uniform resource locator (URL) of the vendor side client 70 in which the part catalog C is stored. The content of a <name of vendor> tag is the name of the vendor issuing the part catalog C (XYZ Corp.). The content of a <model number> tag is the model number (04926-4421) assigned to the part catalog C. The content of a <version number> tag is the version number (01) of the part catalog C. The content of a <permission> tag is a flag showing permission or not-permission related to the quotation of the part catalog C in the part-catalog quotation permission data base DB4.

That is, in the case of permission, a flag of "1" is set in the <permission> tag, and in the case of not-permission, a flag of "0" is set in the <permission> tag. The content of a <component module> flag is a <module> tag expressing the content of the part catalog C. To be specific, the content of the <module> tag is a file (CAT21229.doc) related to the content of the part catalog C. In addition to this file, files of post script (ps) type, XML type, hyper-text markup language (HTML) type, portable document format (pdf) type are described in the <module> tag.

At the step SK1 shown in FIG. 21, the management server 10 judges whether an input is an initial input or not, and in this case, judges the result of determination at the step SK1 to be YES. At the step SK2, the management server 10 reads a DTD from the part-catalog quotation permission data base DB4 and then proceeds to step SK3. The DTD defines tags in the part-catalog information file $F_3$ shown in FIG. 22.

At step SK3, the management server 10 reads a file describing in XML a list of vendors supplying the part catalogs from the part-catalog quotation permission data base DB4 and interprets the tags by the DTD and then displays a vendor list (not shown) on the display 22. The vendor list is a list related to the name, and the address (electronic address, postal address, and telephone number) of the vendor. The registrant operates the registration-related client 20 to select one vendor from among the vendors displayed on the display 22 as a candidate requested to permit the quotation related to the part catalog. The management server 10 returns to the main routine shown in FIG. 5 and judges the result of determination at the step SA10 to be YES and judges the result of determination at the step SK1 shown in FIG. 21 to be NO.

At the step SK4, the management server 10 judges whether there is a response from the vendor or not. The response means whether the vendor permits the client to quote the part catalog to the part-catalog quotation permission data base DB4 or not. In this case, a request is not made to the vendor for a quotation permission and the management server 10 judges the result of determination at the step SK4 to be NO. In the step SK5, the management server 10 reads the information of the vendor specified by the registrant.

At the step SK6, the management server 10 takes out the information of a permission model related to permission from the part-catalog quotation permission data base DB4 and then enters the name of the specified vendor into the permission model (not shown) and then proceeds to step SK6. The permission model is a format document of a permission document and comprises a sentence of, for example, "Dear Mr. ***, we permit your company to quote our catalog XYZ. OOO Corp." In the portion of "OOO Corp." is entered the name of the specified vendor. In this manner, a permission document is made.

At step SK7, the management server 10 sends an electronic mail accompanied by the above-mentioned permission document to the address of a vendor side client 70 placed in the selected vendor shown in FIG. 1 and then returns to the main routine shown in FIG. 5. The content of the electronic mail is a request for the permission of the quotation of the part catalog C. To be specific, management server 10 sends an electronic mail $E_{70A}$ to the address of the vendor side client 70 via the network N. The management server 10 judges the result of determination at the step SA10 shown in FIG. 5 to be YES and judges the result of determination at the step SK1 to be NO. At the step SK4, the management server 10 judges whether there is a response related to the quotation permission from the vendor or not.

When the electronic mail $E_{70A}$ is received by the vendor side client 70, the vendor determines whether he permits the client 70 to quote the part catalog C or not and sends the content of the determination as an electronic mail $E_{70B}$ to the management server 10 via the network N. When the quotation is permitted, the electronic mail $E_{70B}$ accompanied by the permission document is sent to the management server 10 from the vendor side client 70 via the network N. On the other hand, when the quotation is not permitted, the electronic mail $E_{70B}$ of the content to the effect that the quotation is not permitted is sent to the management server 10 from the vendor side client 70 via the network N.

When the management server 10 receives the electronic mail $E_{70B}$, the management server 10 judges the result of determination at the step SK4 to be YES. At the step SK8, the management server 10 judges whether the vendor permit the quotation of the part catalog C or not based on the content of the electronic mail $E_{70B}$, and in the case of permission, judges the result of determination at the step SK8 to be YES.

At the step SK10, the management server 10 sets a flag of "1" in the <permission> tag of the part-catalog information file $F_3$ shown in FIG. 22 and then stores the content of permission (part-catalog information file $F_3$) in the part-catalog quotation permission data base DB4. The management server 10 returns to the main routine shown in FIG. 5. The content of the <module> tag in the part-catalog information file $F_3$ (file related to the content of the part catalog C) is obtained from the vendor side data base based on the URL in the <vendor> tag.

When the vendor revises the part catalog C, the vendor side client 70 notifies the management server 10 of the revision of the part catalog C by the electronic mail $E_{70B}$ via the network N. In this case, the content of the electronic mail $E_{70B}$ is, for example, "NOTICE OF REVISION: The company has upgraded the catalog XYZ to version 02 from version 01". Then, the management server 10 changes the content of the <version number> tag to 02 from 01 in the part-catalog information file $F_3$ shown in FIG. 22.

On the other hand, if the result of judgment in the step SK8 shown in FIG. 21 is NO, that is, in the case where the vendor does not permit the quotation of the part catalog C, the management server 10 proceeds to step SK9. At the step SK9, the management server 10 displays on the display 22 a non-permission message showing that the part-catalog quotation is not permitted and then returns to the main routine shown in FIG. 5.

Reception-Related Processing and Reference-Related Processing:—

A reception-related processing and a reference-related processing in the preferred embodiment will be described with reference to a flow chart shown in FIG. 23. The reception-related processing means the processing of receiving a component registered in the component data base DB1 (a design drawing, a firmware, and the like) by the use of a reception-related client 40. The reference-related processing means the processing of referring to the component by the use of a reference-related client 30.

Figure 23:
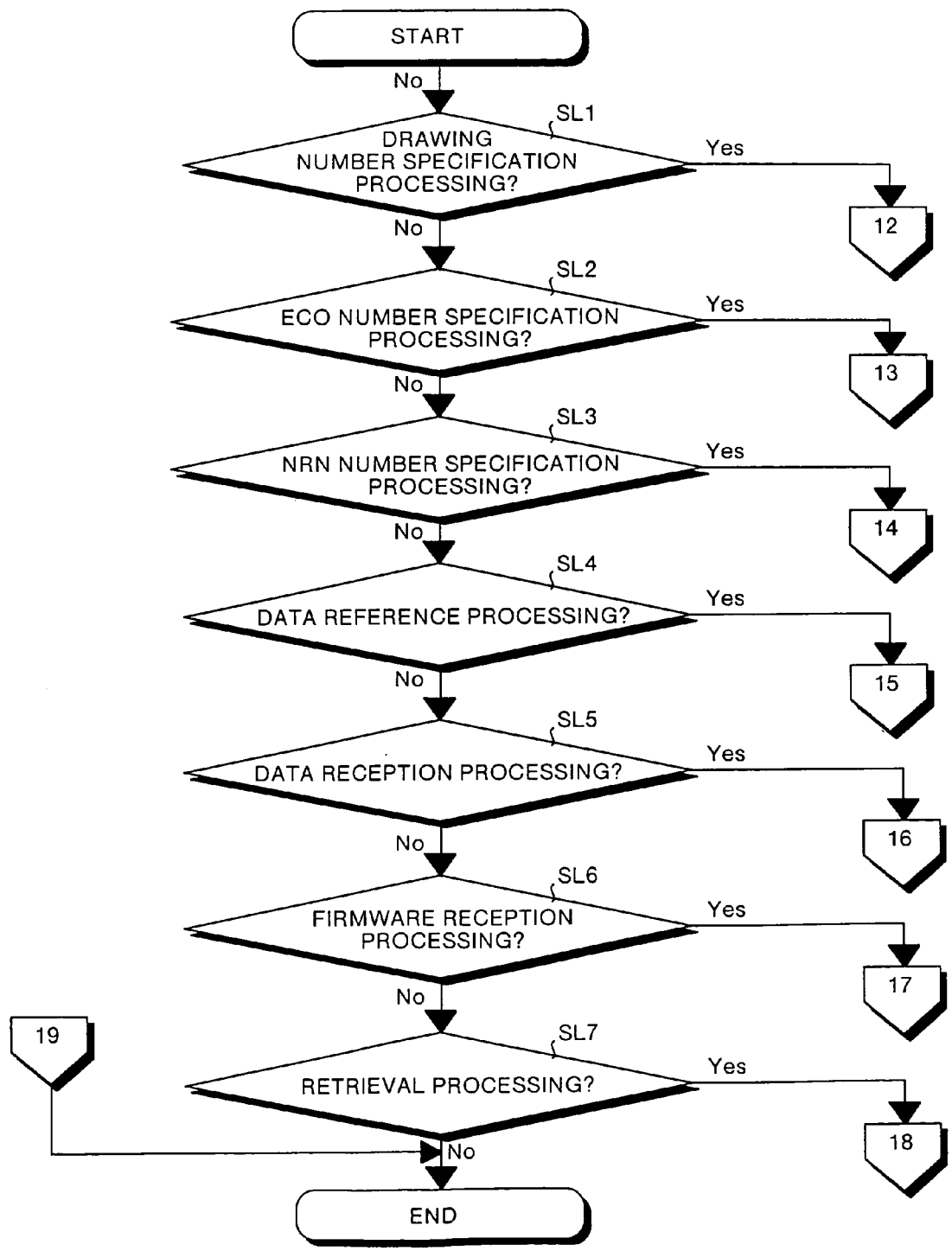
FIG. 23 is a flow chart describing a reception processing and a reference processing in the preferred embodiment in accordance with the present invention.

In the reception-related processing and the reference-related processing, each of the reception-related client 40 and the reference-related client 30 monitors each event from step SL1 to step SL7 shown in FIG. 23 (a drawing number specification processing, an ECO number specification processing, . . . , or a retrieval processing).

Figure 24:
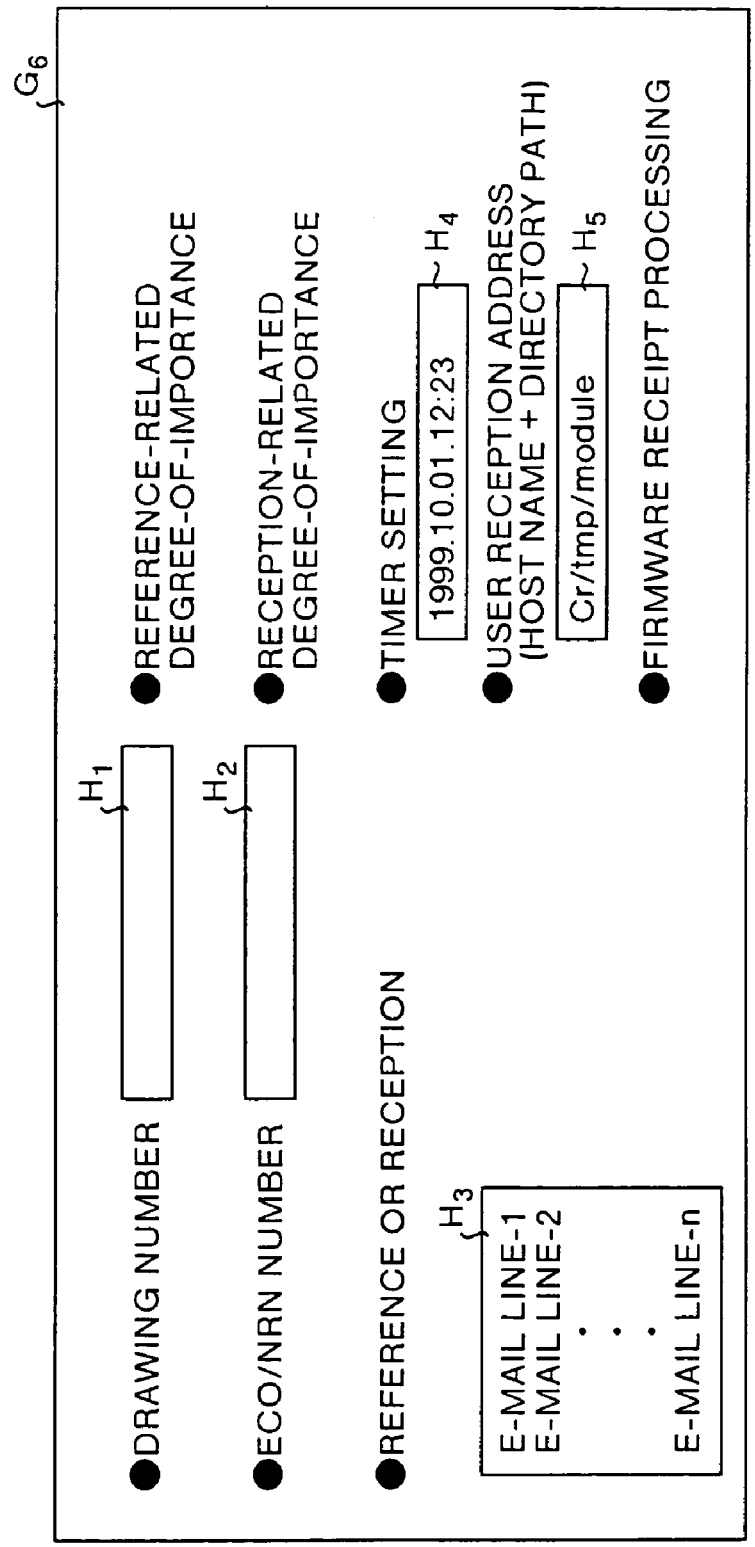
FIG. 24 is an illustration showing a reception/reference-related screen $G_6$ in the preferred embodiment in accordance with the present invention.

When the browser of the reception-related client 40 and the browser of the reference-related client 30 are activated in a state where the registration-related client 20 is in access to the management server 10 via the network N, a reception/reference-related screen $G_6$ shown in FIG. 24 is displayed on a display 42 and on a display 32.

Drawing Number Specification Processing:—

Figure 25:
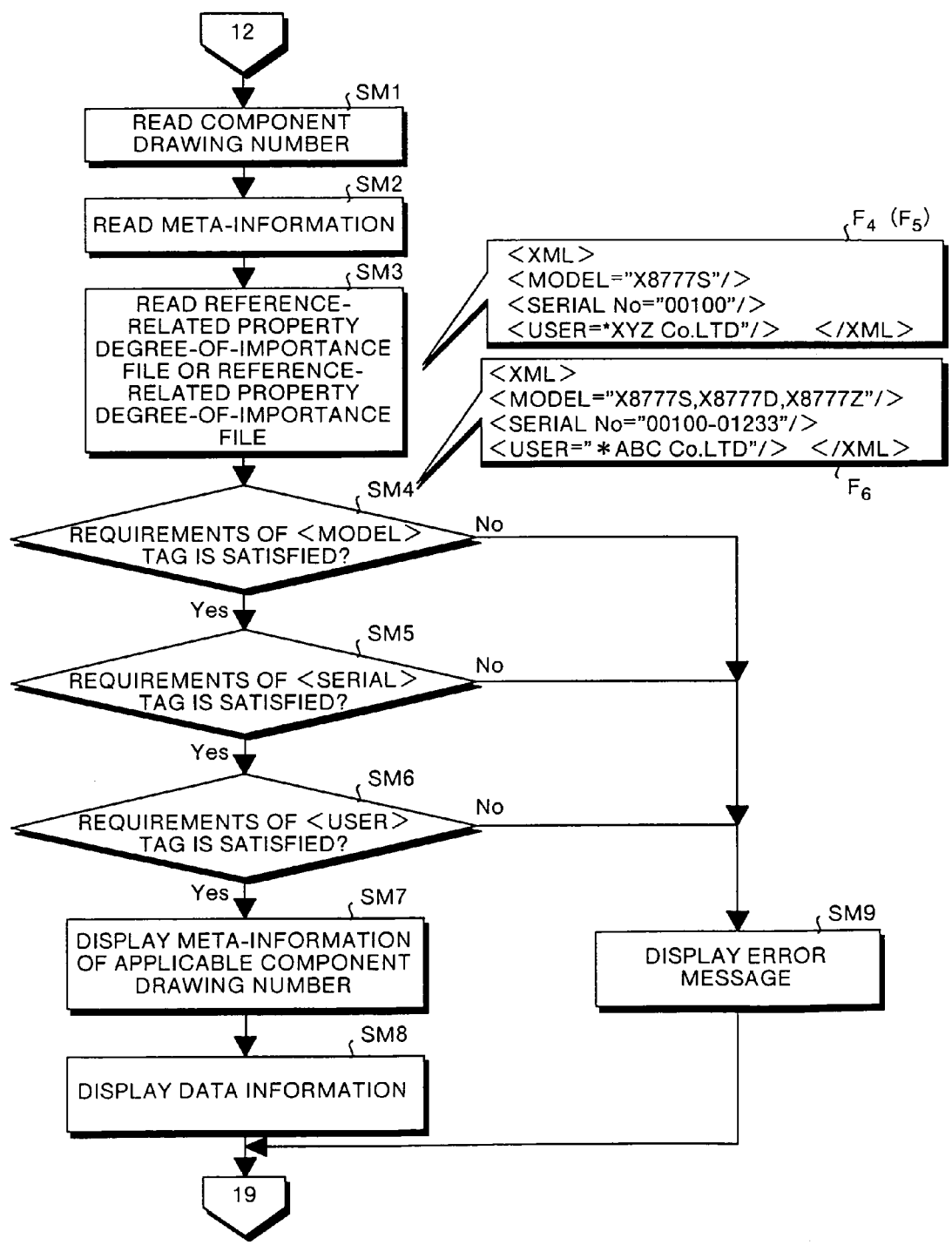
FIG. 25 is a flow chart describing a drawing number specification processing in the preferred embodiment in accordance with the present invention.

When drawing number specification processing is specified in such a state by the registrant by the use of the reception-related client 40, the event of the drawing number specification processing occurs and therefore the reception-related client 40 judges the result of determination at the step SL1 shown in FIG. 23 to be YES and executes the drawing number specification processing from step SM1 to step SM9 shown in FIG. 25.

The drawing number specification processing described above means the processing in which the reception-related client 40 (or the reference-related client 30) receives (or refers to) a component (a design drawing or a firmware) from the component data base DB1 by specifying a drawing number. In this connection, while the reception processing of receiving the component by specifying a drawing number by the use of the reception-related client 40 will be described in the following, the reference processing of referring to the component by the reference-related client 30 is the same as the reception processing.

First, a receiver operates the reception-related client to enter a component drawing number to be received into a drawing number input box $H_1$ of the reception/reference-related screen $G_6$ shown in FIG. 24. The reception-related client 40 reads a component drawing number entered into the drawing number input box $H_1$ at the step SM1 shown in FIG. 25.

At the step SM2, the reception-related client 40 gets access to the management server 10 via the network N to read meta-information corresponding to the component drawing number from the component data base DB1 and then proceeds to as step SM3. In this case, assume that the meta-information file $F_1$ shown in FIG. 4 is read. At the step SM3, the reception-related client 40 reads a reception-related property degree-of-importance file $F_5$ from a storage device 41 and then proceeds to step SM4. The reception-related property degree-of-importance file $F_5$ is a file including information for confining a component to be received by the reception client 40 and is described in XML.

To be specific, in the reception-related property degree-of-importance file $F_5$, the content of a <MODEL> tag is "a model to be distributed" (="X8777S") and the content of a <SERIAL> tag is "a manufacture number to be distributed" (="00100"). The content of a <USER> tag is "where to distribute" (="XYZ Co. LTD"). In this connection, in the case of the reference-related client 30, a reference-related property degree-of-importance file $F_4$ is used which is similar to the reception-related property degree-of-importance file $F_5$.

At the steps SM4 to SM7, the reception-related client 40 compares the registration-related degree-of-importance file $F_6$ forming a part (<WEB FILTER> tag) of the meta-information file $F_1$ (see FIG. 4) with the reception-related property degree-of-importance file $F_5$. That is, at the step SM4, the reception-related client 40 judges whether the condition of the <MODEL> tag is satisfied or not.

To be specific, the reception-related client 40 judges whether the content of the <MODEL> tag (="X8777S") in the reception-related property degree-of-importance file $F_5$, exists in the content of the <MODEL> tag (="X8777S, X8777D, X8777Z") in the registration-related degree-of-importance file $F_5$ or not. In this case, the reception client 40 judges the result of determination at the step SM4 to be YES.

At the step SM5, the reception-related client 40 judges whether the condition of the <SERIAL NO> tag is satisfied or not. To be specific, the reception-related client 40 judges whether the content of the <SERIAL NO> tag (="00100") in the reception-related property degree-of-importance file $F_5$, exists in the content of the <SERIAL NO> tag (="00100 to 01233") in the registration property importance file $F_6$ or not. In this case, the reception-related client 40 judges the result of determination at the step SM5 to be YES.

At the step SM6, the reception-related client 40 judges whether the condition of the <USER> tag is satisfied or not. To be specific, the reception-related client 40 judges whether the content of the <USER> tag (="XYZ Co. LTD") in the reception-related property degree-of-importance file $F_5$, satisfies the content of the <USER> tag (="* ABC Co. LTD") in the registration-related degree-of-importance file $F_6$ or not. In this case, since "a* ABC Co. LTD" expresses a place other than "ABC Co. LTD", the reception-related client 40 judges the result of determination at the step SM6 to be YES.

At the step SM7, the reception-related client 40 displays the meta-information (component drawing number: CA20001-0000, part name: PROM) in a region $G_8$ in a drawing number specification processing screen $G_7$ shown in FIG. 26 based on the meta-information $F_1$ shown in FIG. 4 and then proceeds to step SM8. In this connection, the drawing number specification processing screen $G_7$ is displayed on the display 42.

At the step SM8, the reception-related client 40 receives a component from the component data base DB1 via the network N and then displays the data information (component module: CA20001-0000.ps, CA20001-0000.doc, . . . ) in a region $G_9$ in the drawing number specification processing screen $G_7$ and then proceeds to the main routine shown in FIG. 23.

In this respect, if one of the results of judgment at the steps SM4 to SM6 is NO, the component is not permitted to be received and therefore the reception-related client 40 proceeds to step SM9. At the step SM9, the reception-related client 40 displays an error massage of "it is not permitted to receive or to refer to a component specified by a drawing number." on the display 42 and then returns to the main routine shown in FIG. 23.

ECO Number Specification Processing:—

Figure 27:
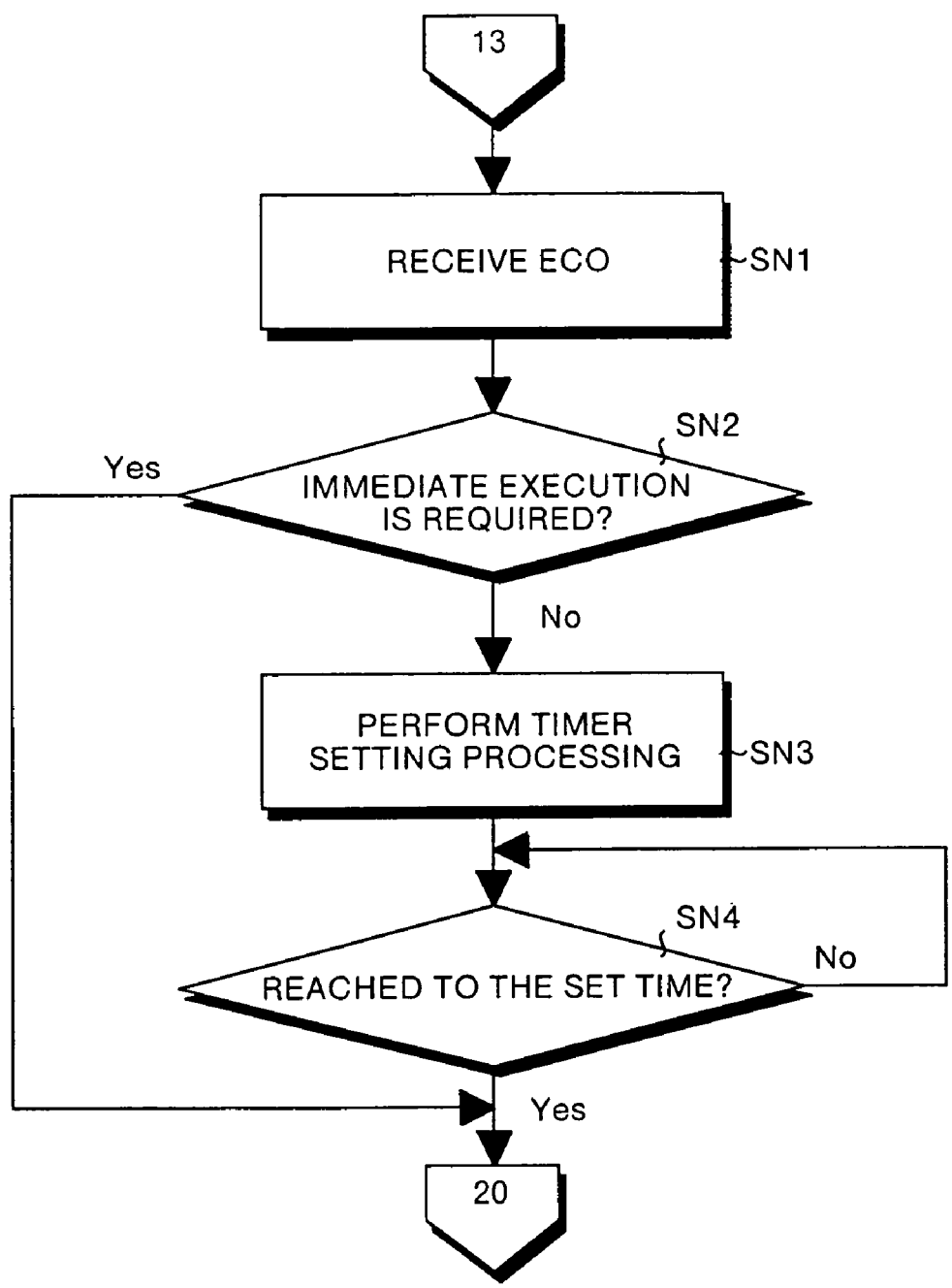
FIG. 27 is a flow chart describing an ECO number specification processing in the preferred embodiment in accordance with the present invention.

When ECO number specification processing is specified by the receiver by the use of the reception-related client 40, the event of the ECO number specifying processing occurs and therefore the reception-related client 40 judges the result of determination at step SL2 shown in FIG. 23 to be YES and executes the ECO number specification processing from step SN1 to step SN4 shown in FIG. 27. The ECO number specifying processing is the processing of receiving a revised component by the reception-related client 40 in the case where a revised design notice (see ECO: FIG. 11, FIG. 12) is notified to the reception-related client 40 by the management server 10 through an electronic mail $E_{40}$ in the above-mentioned notification processing (see FIG. 19).

When the revised design notice (ECO) is received through the electronic mail $E_{40}$ by the reception-related client 40 at the step SN1 shown in FIG. 27, the reception-related client 40 proceeds to step SN2. At the step SN2, the reception-related client 40 judges whether it is required to immediately execute the processing of receiving the revised component or not. To be specific, the reception-related client 40 judges at the step SN2 whether a set time is entered into a timer setting input box $H_4$ shown in FIG. 24 or not.

Figure 28:
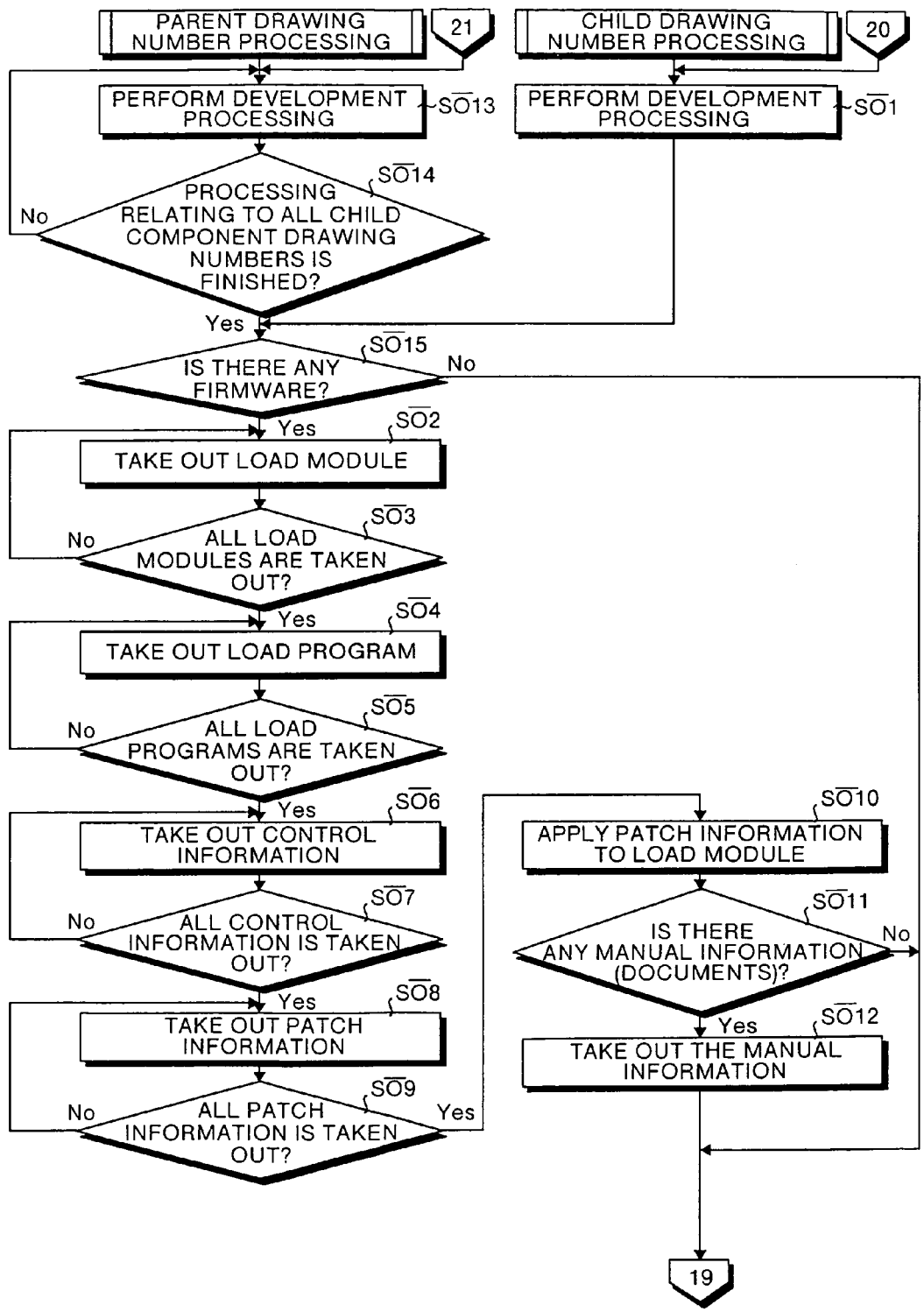
FIG. 28 is a flow chart describing a reception processing in the preferred embodiment in accordance with the present invention.

In this case, since a set time of "1999. 10. 01. 12: 23" is entered into the timer setting input box $H_4$ by the receiver, the reception-related client 40 judges the result of determination at the step SN2 to be NO and proceeds to step SN3. In this respect, in the case where the timer setting input box $H_4$ is blank, the reception client 40 judges the result of determination at the step SN2 to be YES and proceeds to step S01 shown in FIG. 28.

At the step SN3, the reception-related client 40 reads the set time entered into the timer setting input box $H_4$ (="1999. 10. 01. 12: 23") and executes a timer setting processing. At the step SN4, the reception-related client 40 judges whether the time of a timer (not shown) agrees with the above-mentioned set time or not and in the case where the result of the judgment is NO, the above judgment is repeated. When the time of the timer agrees with the set time, the reception client 40 judges the result of determination at the step SN4 to be YES and proceeds to the step SO1 shown in FIG. 28.

At the step SO1, the reception-related client 40 receives the meta-information corresponding to the component drawing number specified by the revised design notice (ECO) from the component data base DB1 via the network N. Reception-related client 40 develops a plurality of child component drawing numbers from the above meta-information and then receives revised child component drawings (see FIG. 2) corresponding to the plurality of child component drawing numbers.

At the step S05, the reception-related client 40 judges whether there is a firmware in the received child component drawings or not and, if the result of the judgment is NO, returns to the main routine shown in FIG. 23. In the case where the reception-related client 40 receives, at the step Sol, meta-information SK and $SK_F$ including information relating to a firmware shown in FIG. 3, the reception-related client 40 judges the result of determination at the step SO15 to be YES.

At the step SO2, the reception-related client 40 takes out a load module (component) having a file name of "M9CA41000-1000a.rom" written in a "Load Modules" box from the data block of the component data base DB1 via the network N, based on the meta-information $SK_F$ shown in FIG. 3. At the step SO3, the reception-related client 40 judges whether all load modules are taken out or not and, in this case, judges the result of determination at the step SO3 to be NO and returns to the step SO2.

At the step SO2, the reception-related client 40 takes out a load module (component) having a file name of "M9CA41000-1001a.rom" written in a "Load Modules" box from the data block of the component data base DB1 via the network N, based on the meta-information $SK_F$ shown in FIG. 3. At the step SO3, the reception-related client 40 judges the result of determination at the step SO3 to be YES.

At the step SO4, the reception-related client 40 takes out a load program (component) having a file name of "L9CA41000-1000a.exe" written in a "Load Program" box from the data block of the component data base DB1 via the network N, based on the meta-information $SK_F$ shown in FIG. 3. At the step SO5, the reception-related client 40 judges whether all load programs are taken out or not and, in this case, judges the result of determination at the step SO5 to be YES and returns to step SO6.

At the step SO6, the reception-related client 40 takes out a control information (component) having a file name of "C9CA41000-1001a.txt" written in a "Load Control" box from the data block of the component data base DB1 via the network N, based on the meta-information $SK_F$ shown in FIG. 3. At the step SO7, the reception-related client 40 judges whether all control information is taken out or not and, in this case, judges the result of determination at the step SO5 to be YES and returns to step S08.

At the step SO8, the reception-related client 40 takes out a patch information (component) having a file name of "P9CA41000-1000a.exe" written in a "Patches" box from the data block of the component data base DB1 via the network N, based on the meta-information $SK_F$ shown in FIG. 3. At the step SO9, the reception-related client 40 judges whether all patch information is taken out or not and, in this case, judges the result of determination at the step SO5 to be YES and returns to step SO10.

At the step SO10, the reception-related client 40 applies the patch information to the load module taken out at the step SO2 according to the control information taken out at the step SO6 to correct the load module and then proceeds to step SO11. This is the end of revising a firmware (load module). At the step SO11, the reception-related client 40 judges whether manual information (document) relating to the manual of the firmware exits in the meta-information $SK_F$ or not and, if the result of the judgment is NO, returns to the main routine shown in FIG. 23.

In this case, since a file name of "M1CA41000-1000a.doc" is written in a "Manuals" box in the meta-information $SK_F$ shown in FIG. 3, the reception-related client 40 judges the result of determination at the step SO11 to be YES. At the step SO12, the reception-related client 40 takes out manual information (component) having a file name of the "M1CA41000-1000a.doc" from the data block of the component data base DB1 via the network N and then returns to the main routine shown in FIG. 23.

NRN Number Specification Processing:—

Figure 29:
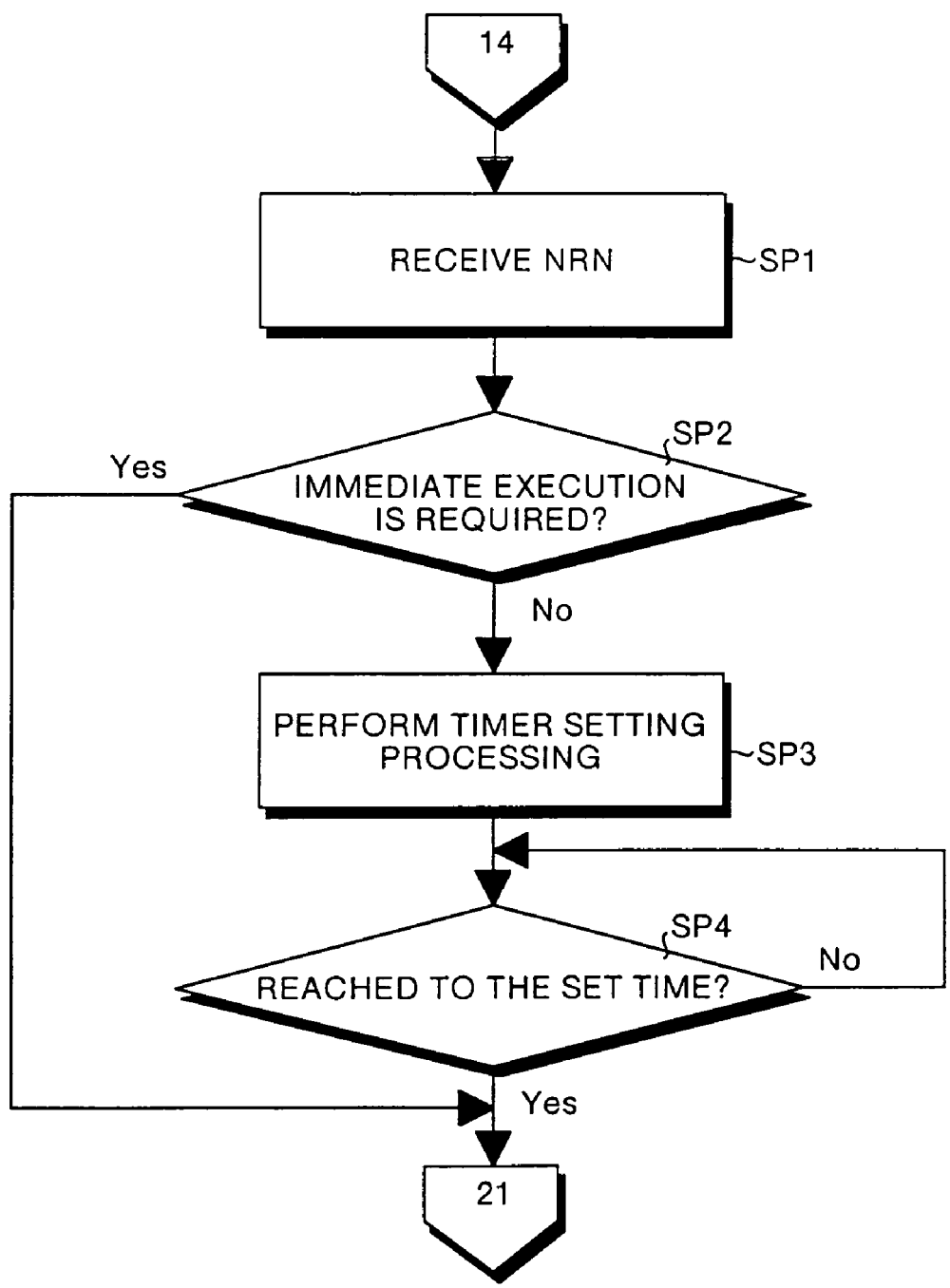
FIG. 29 is a flow chart describing an NRN number specification processing in the preferred embodiment in accordance with the present invention.

When NRN number specification processing is specified by the receiver by the use of the reception-related client 40, the event of the NRN number specification processing occurs and therefore the reception-related client 40 judges the result of determination at the step SL3 shown in FIG. 23 to be YES and executes the NRN number specification processing from step SP1 to step SP4 shown in FIG. 29. The NRN number specification processing is the processing of receiving a newly registered component by the reception-related client 40 in the case where a new design notice (see NRN: FIG. 11, FIG. 12) is notified to the reception-related client 40 by the management server 10 through the electronic mail $E_{40}$ in the above-mentioned notification processing (see FIG. 19).

When the revised design notice (NRN) is received through the electronic mail $E_{40}$ by the reception-related client 40 at the step SP1 shown in FIG. 29, the reception-related client 40 proceeds to step SP2. At the step SP2, the reception-related client 40 judges whether it is required to immediately execute the processing of receiving the newly registered component or not. To be specific, the reception-related client 40 judges at the step SP2 whether a set time is entered into the timer setting input box $H_4$ shown in FIG. 24 or not.

In this case, since a set time of "1999. 10. 01. 12: 23" is entered into the timer setting input box $H_4$, the reception-related client 40 judges the result of determination at the step SP2 to be NO and proceeds to step SP3. In this respect, in the case where the timer setting input box $H_4$ is blank, the reception-related client 40 judges the result of determination at the step SP2 to be YES and proceeds to step SO13 shown in FIG. 28.

At the step SP3, the reception-related client 40 reads the set time entered into the timer setting input box $H_4$ (="1999. 10. 01. 12: 23") and executes the timer setting processing. At the step SP4, the reception-related client 40 judges whether the time of a timer (not shown) agrees with the above-mentioned set time or not and in the case where the result of the judgment is NO, the judgment is repeated. When the time of the timer agrees with the set time, the reception-related client 40 judges the result of determination at the step SP4 to be YES and proceeds to the step SO13 shown in FIG. 28.

At the step SO13, the reception-related client 40 receives the meta-information corresponding to a parent component drawing number specified by the new design notice (NRN) from the component data base DB1 via the network N. Reception-related client 40 develops a plurality of child component drawing numbers of the second layer from the above meta-information, as shown in FIG. 2, and then receives newly registered child component drawings (see FIG. 2) corresponding to the plurality of child component drawing numbers from the component data base DB1 via the network N.

At the step SO14, the reception-related client 40 judges whether processing relating to all the child component drawing numbers is finished or not, that is, whether the development of the child component drawing numbers of the n-th (bottom) layer shown in FIG. 2 is finished or not and, in this case, judges the result of determination at the step SO14 to be NO and returns to the step SO13.

At the step SO13, the reception-related client 40 develops the child component drawing numbers of the n-th (bottom) layer, as shown in FIG. 2, and then receives the newly registered child component drawings (see FIG. 2) corresponding to the developed child component drawing numbers from the component data base DB1 via the network N. At the step SO14, the reception-related client 40 judges the result of determination at the step SO14 to be YES and proceeds to step SO15. Thereafter, the reception-related client 40 executes the processing following the step SO15 as is the case with the above-mentioned action.

Data Reference Processing:—

Figure 30:
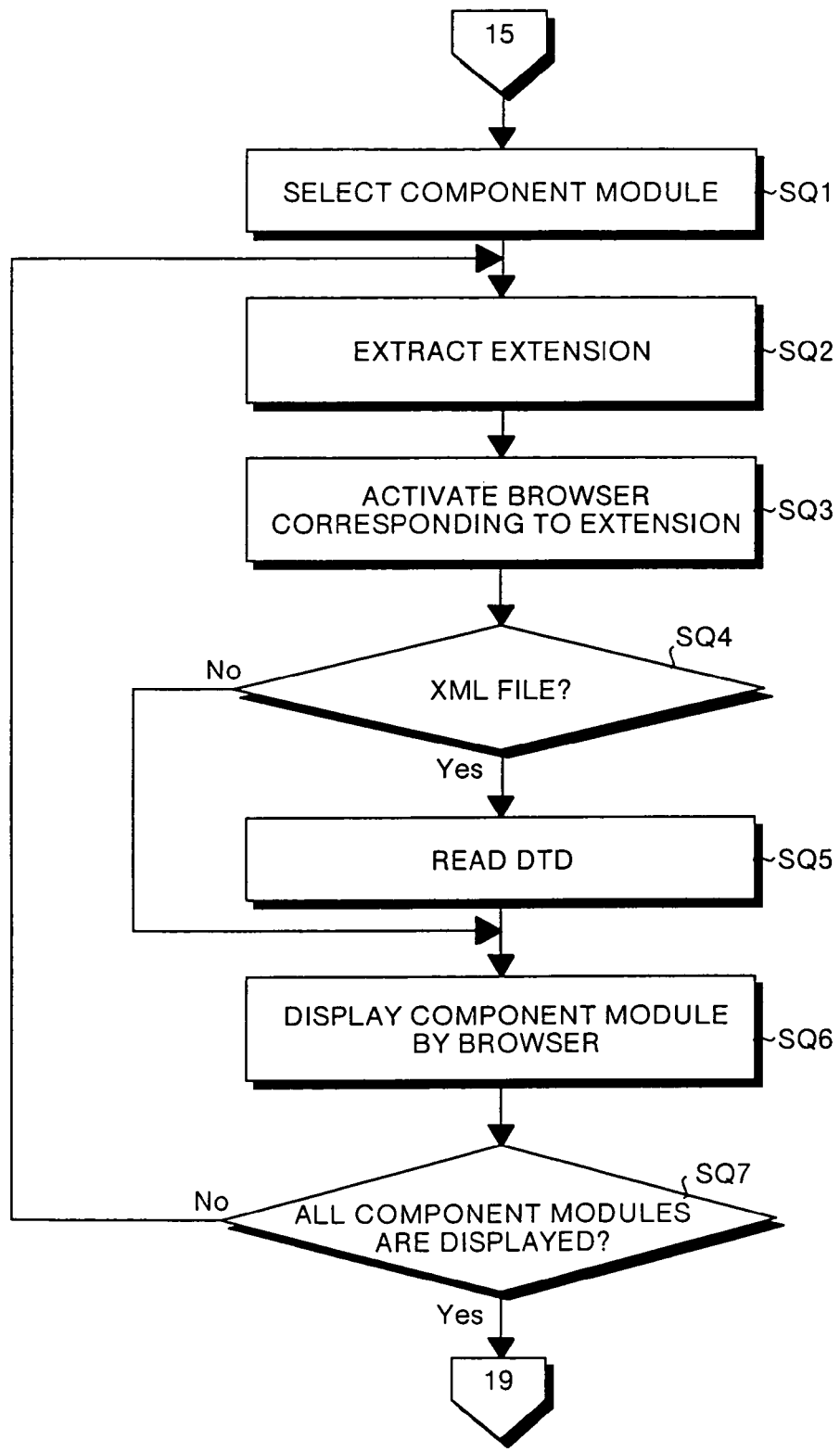
FIG. 30 is a flow chart describing a data reference processing in the preferred embodiment in accordance with the present invention.

When data reference processing is specified by a referring person by the use of the reference-related client 30, the event of the data reference processing occurs and therefore the reference-related client 30 judges the result of determination at the step SL4 shown in FIG. 23 to be YES and executes the data reference processing from step SQ1 to step SQ7 shown in FIG. 30. The data reference processing is the processing executed after the completion of the above-mentioned drawing number specification processing (see FIG. 25).

Figure 31:
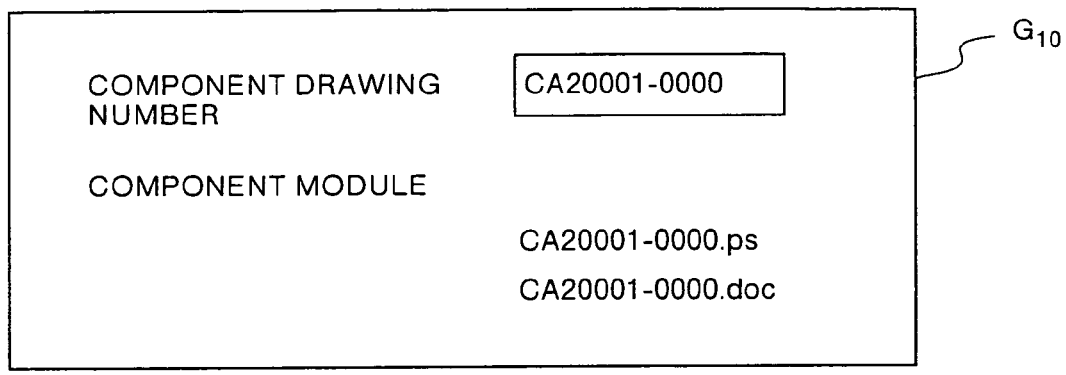
FIG. 31 is an illustration showing a data reference processing screen $G_{10}$ in the preferred embodiment in accordance with the present invention.

That is, at the step SQ1 shown in FIG. 30, the referring person selects one component module to be referred from among component modules (CA20001-0000.ps, CA20001-0000.doc) in the data reference processing screen $G_{10}$ (see FIG. 31) displayed on the display 32. The data reference processing screen $G_{10}$ corresponds to the above-mentioned drawing number specification processing screen $G_7$ (see FIG. 26). In this case, assume that the referring person selects the component module having a file name of "CA20001-0000.ps".

At the step SQ2, the reference-related client 30 extracts an extension (=ps) from the "CA20001-0000.ps" selected at the step SQ1. In the step SQ3, the reference-related client 30 activates a browser corresponding to the extension (=ps).

At the step SQ4, the reference-related client 30 judges whether the file of the component selected at the step SQ1 is an XML file or not and, in this case, judges the result of determination at the step SQ4 to be NO and proceeds to the step SQ6. In this connection, if the result of the judgment is YES, the reference-related client 30 reads a DTD having a tag defined in the XML file from a storage device 31 and then proceeds to step SQ6.

In this case, at the step SQ6, the reference-related client 30 displays the component module (file name: CA20001-0000.ps) stored in the data block of the component data base DB1 on the display 32 by the browser activated at the step SQ3 via the network N and then proceeds to step SQ7.

In this manner, the referring person refers to a desired component module (design drawing and the like) by the use of the display screen of the display 32. In this connection, in the case where the component module is the one other than a document such as a firmware or the like, the reference-related client 30 does not display the firmware or the like on the display 32.

At the step SQ7, the reference-related client 30 judges whether all component modules selected at the step SQ1 are displayed on the display 32 or not and, in this case, judges the result of determination at the step SQ7 to be YES and returns to the main routine shown in FIG. 23. In this respect, if a plurality of component modules are selected at the step SQ1, the reference-related client 30 judges the result of determination at the step SQ7 to be NO and returns to the step SQ2 and executes a processing of displaying the next component module, as is the case with the above-mentioned action.

Data Reception Processing:—

Figure 32:
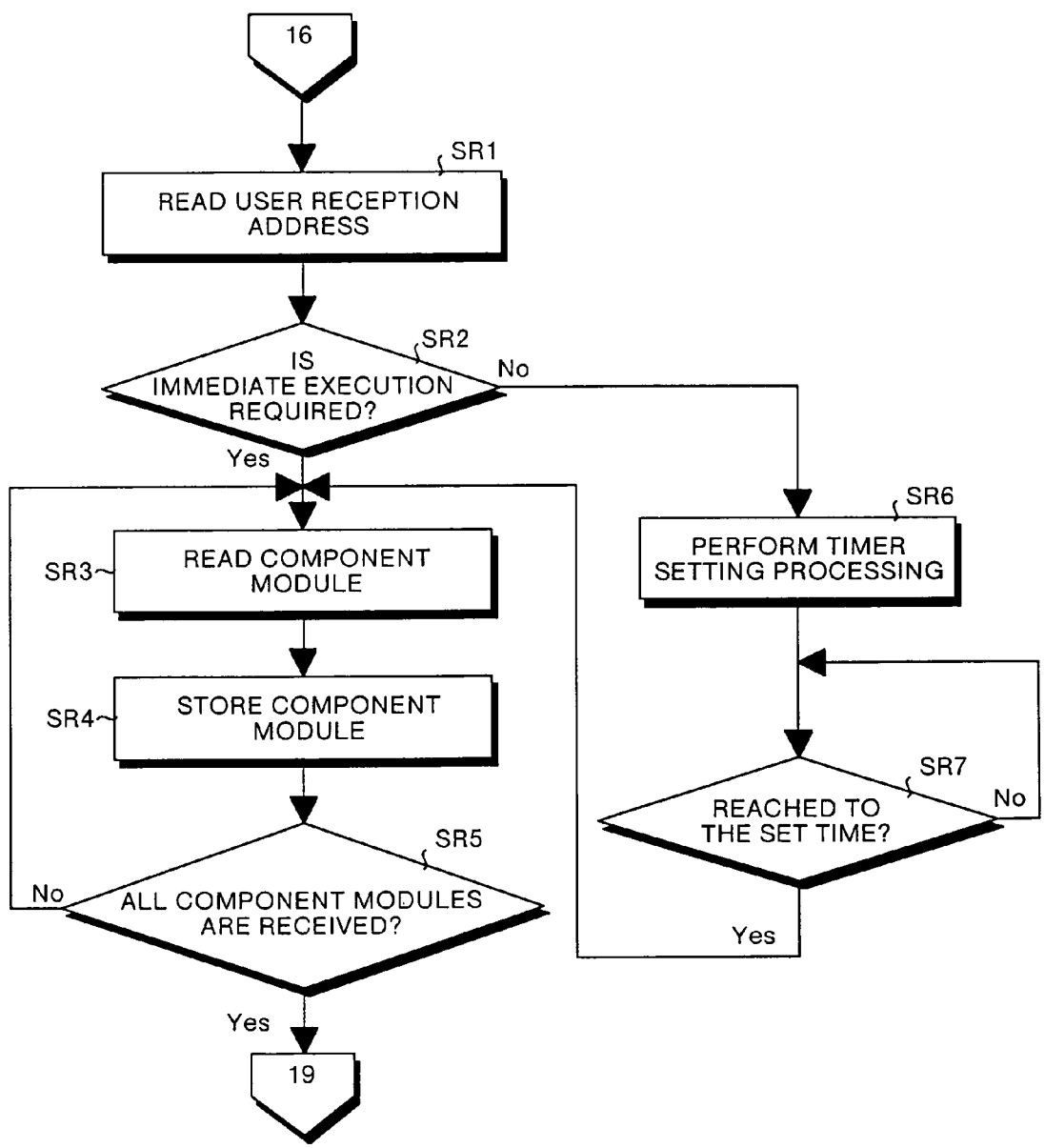
FIG. 32 is a flow chart describing a data reception processing in the preferred embodiment in accordance with the present invention.

When data reception processing is specified by the receiver by the use of the reception-related client 40, the event of the data reception processing occurs and therefore the reception-related client 40 judges the result of determination at the step SL5 shown in FIG. 23 to be YES and executes the data reception processing from step SR1 to step SR7 shown in FIG. 32. The data reception processing is the processing executed after the completion of the above-mentioned drawing number specification processing (see FIG. 25).

That is, at the step SR1 shown in FIG. 32, the reception-related client 40 reads a user reception address (Cr/tmp/module) entered into the user reception address input box $H_5$ in the reception/reference-related screen $G_6$ shown in FIG. 24 and then proceeds to step SR2. The user reception address is a directory of a storage device 41 in which the component (component module: design drawing, firmware, and the like) stored in the data block of the component data base DB1 is stored when it is received. The user reception address is entered by the receiver.

At the step SR2, the reception-related client 40 judges whether it is required to immediately execute the processing of receiving the component module or not. To be specific, the reception-related client 40 judges the step SR2 according to whether a set time is entered into the timer setting input box $H_4$ shown in FIG. 24 or not.

In this case, since the set time of "1999. 10. 01. 12: 23" is entered into the timer setting input box $H_4$ by the receiver, the reception-related client 40 judges the result of determination at the step SR2 to be NO and proceeds to step SR6. In this connection, in the case where the timer setting input box $H_4$ is blank, the reception-related client 40 judges the result of determination at the step SR2 to be YES and proceeds to step SR3.

At the step SR6, the reception-related client 40 reads the set time of "1999. 10. 01. 12: 23" entered into the timer setting input box $H_4$ and executes a timer setting processing. At the step SR7, the reception-related client 40 judges whether the time of the timer (not shown) agrees with the above-mentioned set time or not and repeats the judgment in the case where the result of the judgment is NO. When the time of the timer (not shown) agrees with the set time, the reception-related client 40 judges the result of determination at the step SR7 to be YES.

Figure 26:
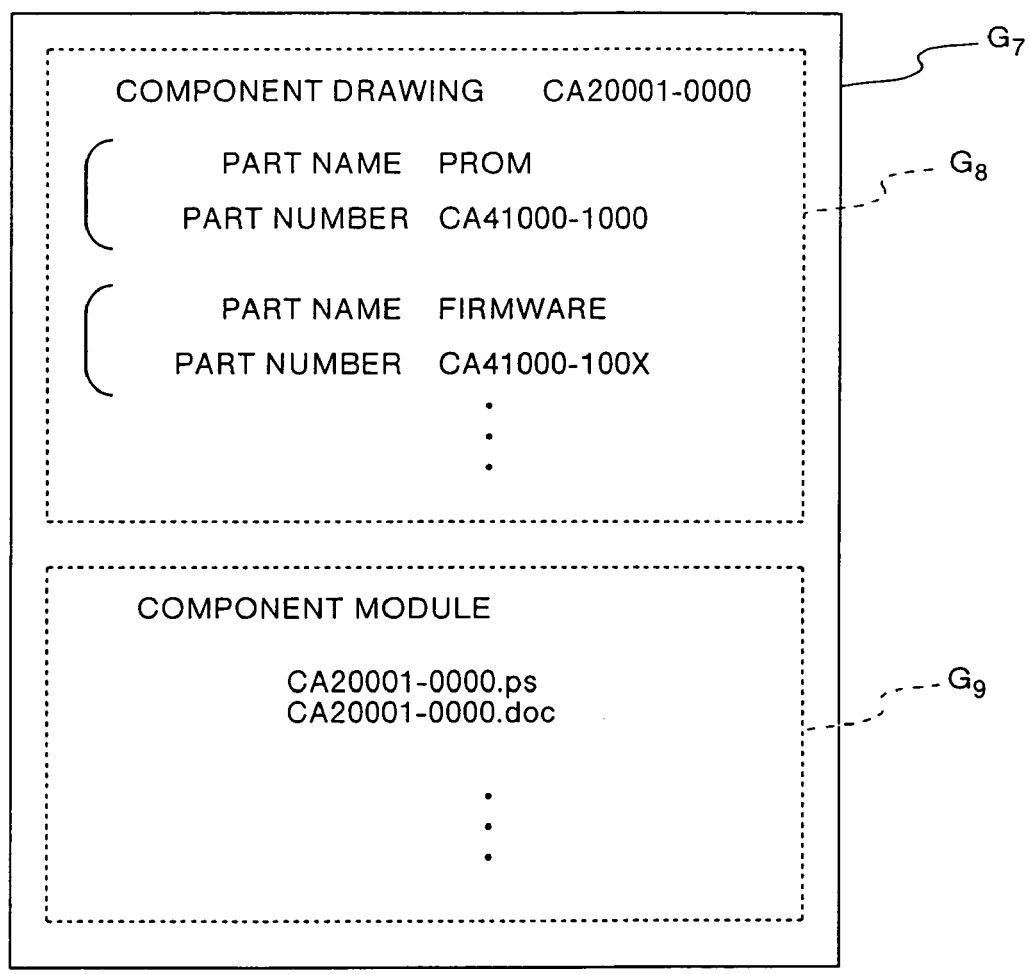
FIG. 26 is an illustration showing a drawing number specification processing screen $G_7$ in the preferred embodiment in accordance with the present invention.

At the step SR3, the reception-related client 40 reads the component module (CA20001-0000.ps) displayed in the region $G_9$ in the drawing number specification screen $G_7$ shown in FIG. 26 from the data block of the component data base DB1 via the network N.

At the step SR4, the reception-related client 40 stores the received component module (CA20001-0000.ps) in the directory of the storage device 41 corresponding to the user reception address (see FIG. 24). At the step SR5, the reception-related client 40 judges whether all component modules are received or not. In this case, since the component module shown in FIG. 26 (CA20001-0000.doc) is not yet received, the reception-related client 40 judges the result of determination at the step SR5 to be NO and returns to step SR3.

At the step SR3, the reception-related client 40 reads the component module (CA20001-0000.doc) from the data block of the component module data base DB1 via the network N. At the step SR4, the reception-related client 40 stores the received component module (CA20001-0000.doc) in the directory of the storage device 41 corresponding to the user reception address (see FIG. 24). At the step SR5, the reception-related client 40 judges the result of determination at the step SR5 to be YES and returns to the main routine shown in FIG. 23.

Firmware Reception Processing:—

Figure 33:
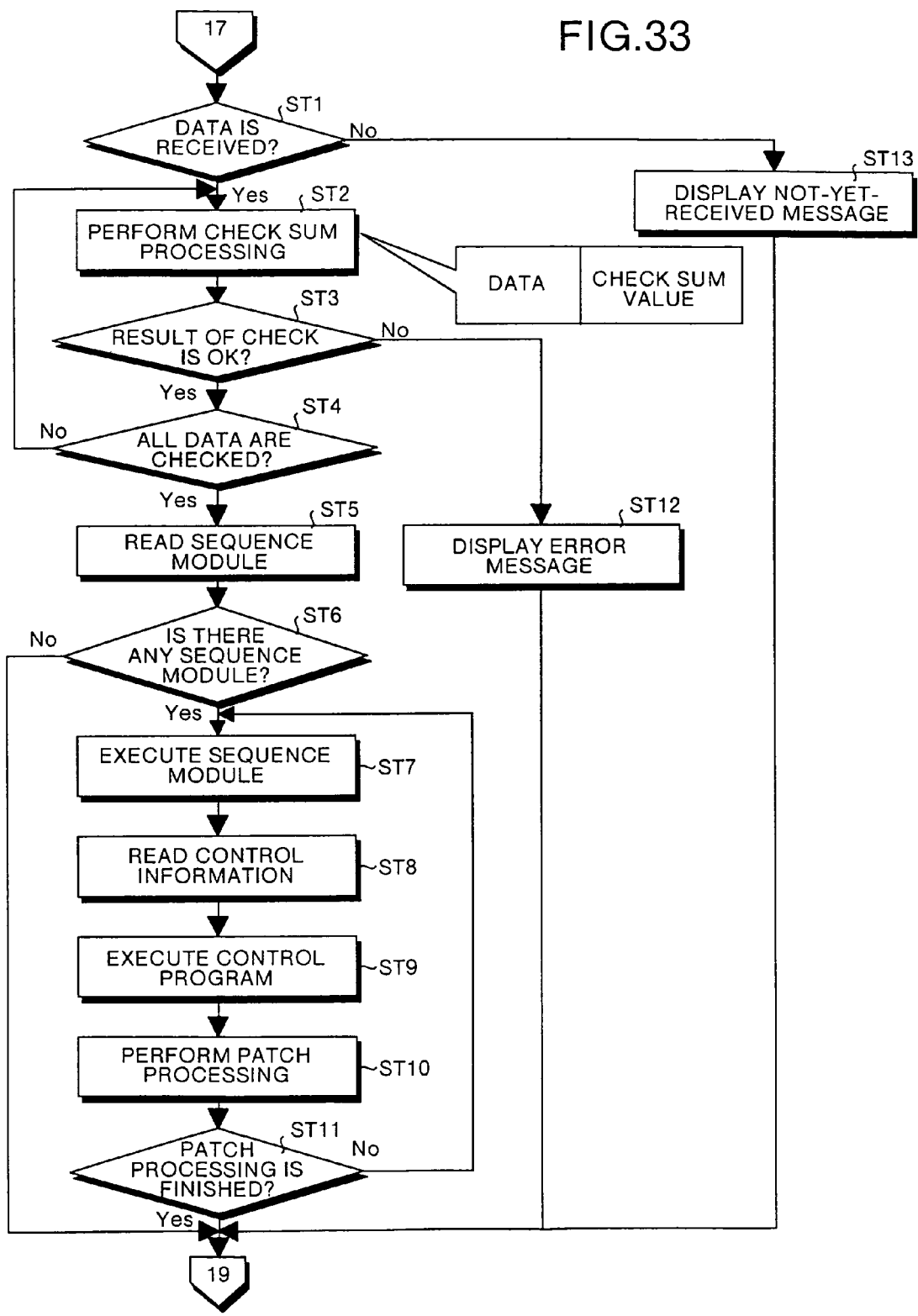
FIG. 33 is a flow chart describing a firmware reception processing in the preferred embodiment in accordance with the present invention.

When firmware reception processing is specified by the receiver by the use of the reception-related client 40, the event of the data reception processing occurs and therefore the reception-related client 40 judges the result of determination at the step SL6 shown in FIG. 23 to be YES and executes the firmware reception processing from step ST1 to step ST13 shown in FIG. 33. The firmware reception processing is the processing executed after the completion of the above-mentioned data reception processing (see FIG. 32) and receiving a firmware.

That is, after the completion of the data reception processing (see FIG. 32), at the step ST1 shown in FIG. 33, the reception-related client 40 judges whether it receives the data (component) or not and if the result of the judgment is NO proceeds to step ST13. At the step ST13, the reception-related client 40 displays a not-yet-received message of, for example, "a target component module is not received." on the display 42 and then returns to the main routine shown in FIG. 23.

On the other hand, if the result of the judgment at the step ST1 is YES, the reception-related client 40 proceeds to step ST2. At the step ST2, the reception-related client 40 executes a check sum processing to the received component module (data+check sum value) and then proceeds to step ST3. The sum of the data and the check sum value is received as a component module by the reception client 40.

At the step ST3, the reception-related client 40 judges whether the result of check in the check sum processing is OK or not and, if the result of the judgment is NO, proceeds to step ST12. At the step ST12, the reception-related client 40 displays an error message of, for example, "a check sum error has occurred." on the display 42 and then returns to the main routine shown in FIG. 23.

On the other hand, if the result of the judgment at the step ST3 is YES, the reception-related client 40 proceeds to step ST4. At the step ST4, the reception-related client 40 judges whether all component modules are checked or not and, if the result of the judgment is NO, returns to the step ST2 and executes a check sum processing to the next component module.

When the result of the judgment at the step ST4 becomes YES, the reception-related client 40 proceeds to step ST5 and reads a sequence module from among the received component modules from the storage device 41 and then proceeds to step ST6. The sequence module means a module related to a series of sequences for automatically correcting a firmware. In this connection, in the case the reception-related client 40 does not receives the sequence module, the reception-related client 40 skips the step ST5 and proceeds to step ST6.

At the step ST6, the reception-related client 40 judges whether there is a sequence module or not, and if the result of the judgment is NO, returns to the main routine shown in FIG. 23. On the other hand, if the result of the judgment at the step ST6 is YES, the reception-related client 40 proceeds to step ST7. At the step ST7, the reception-related client 40 executes a sequence module. At step 8, the reception-related client 40 reads control information for correcting the firmware and then proceeds to step ST9.

At the step ST9, the reception-related client 40 executes a control program for automatically executing the correction of the firmware and then proceeds to step ST10. At the step ST10, the reception-related client 40 executes a patch processing to the firmware according to the sequence module, control information and a control program and then proceeds to step ST11.

At the step ST11, the reception-related client 40 judges whether the series of sequences are completed or not and, if the result of the judgment is NO, returns to the step ST7. When the automatic correction (patch processing) of the firmware is completed, the reception-related client 40 judges the result of determination at the step ST11 to be YES and returns to the main routine shown in FIG. 23.

Retrieval Processing:—

Figure 34:
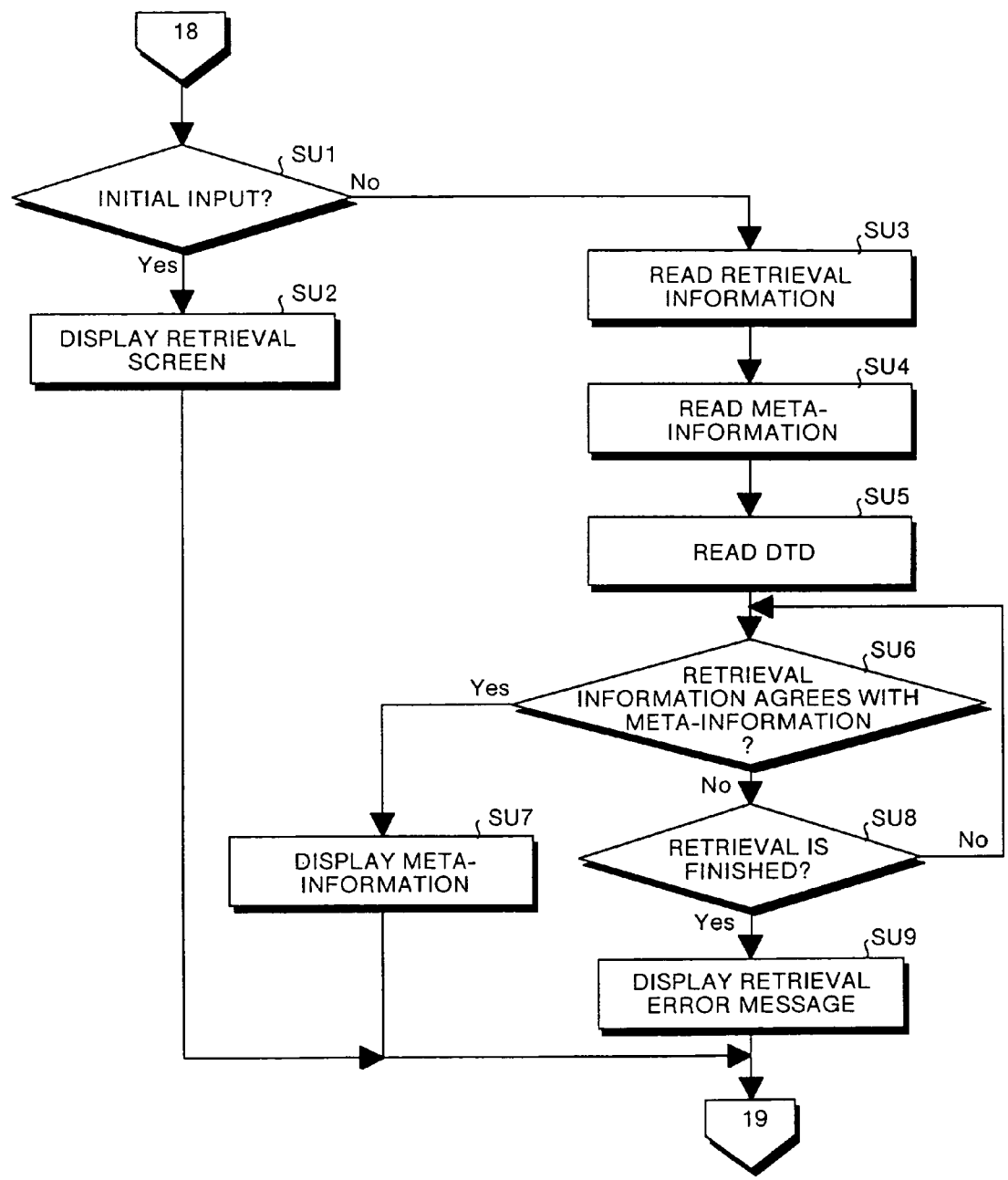
FIG. 34 is a flow chart describing a retrieval processing in the preferred embodiment in accordance with the present invention.

When retrieval processing is specified by the receiver (or the referring person) by the use of the reception-related client 40 (or the reference-related client 30), the event of the retrieval processing occurs and therefore the reception-related client 40 judges the result of determination at the step SL7 shown in FIG. 23 to be YES and executes the retrieval processing from step SU1 to step SU9 shown in FIG. 34.

The retrieval processing is the processing of retrieving desired meta-information among the meta-information stored in the meta-block of the component data base DB1 by using a component drawing number as a key. In this connection, while the retrieval processing by the reception-related client 40 will be described, a retrieval processing by the reference-related client 30 is also the same as the retrieval processing by the reception-related client 40.

At step SU1 shown in FIG. 34, the reception-related client 40 judges whether the input is an initial input or not and, in this case, judges the result of determination at the step SU1 to be YES. At the step SU2, the reception-related client 40 displays on the display 42 a retrieval screen (not shown) having an input box for entering retrieval information (component drawing number) and then returns to the main routine shown in FIG. 23. In this manner, the receiver enters a desired component drawing number into the above-mentioned input box as retrieval information.

The reception-related client 40 judges the result of determination at the step SL7 shown in FIG. 23 to be YES and the step SU1 shown in FIG. 34 to be NO. At the step SU3, the reception-related client 40 reads the retrieval information (component drawing number) entered by the receiver.

At the step SU4, the reception-related client 40 reads meta-information written in XML from the meta-block of the component data base DB1. At the step SU5, the reception-related client 40 reads DTD for defining a tag in the meta-information from the component data base DB1. At the step SU6, the reception-related client 40 judges whether a component drawing number in the meta-information agrees with the retrieval information (component drawing number) or not and, if the result of the judgment is YES, proceeds to step SU7.

At the step SU7, the reception-related client 40 displays the meta-information on the display 42 as the result of retrieval and then returns to the main routine shown in FIG. 23. On the other hand, if the result of the judgment at the step SU6 is NO, the reception-related client 40 proceeds to step SU8. At the step SU8 judges whether retrieval is completed or not and, if the result of the judgment is NO, returns to the step SU6 and judges whether the next component drawing number in the meta-information agrees with the retrieval information (component drawing number) or not.

If the result of the judgment at the step SU8 is YES, the reception-related client 40 proceeds to the step SU9 and displays on the display 42 an retrieval error message of, for example, "there is no applicable component drawing number." and then returns to the main routine shown in FIG. 23.

In this connection, it is also recommended that, if a notification processing is performed at the step SA8 (see FIG. 5), a ping command be sent to the reference-related client 30, the reception client 40, and the object machine 50 by the management server 10 to check the conditions of a communications line and that, in the case where the communications line of the object machine 50 is normal, the object machine 50 receive or refer to the component instead of the reference-related client 30 or the reception-related client 40. The object machine 50 is a high level machine above the reference-related client 30 and the reception-related client 40.

In the case where the communications line of the object machine 50 is abnormal and the communications lines of the reference-related client 30 and the reception-related client 40 are normal, it is also recommended that the reception-related client 40 or the reference-related client 30 receive or refer to the component.

As described above, since the hardware and the firmware are regarded as the same management level and a plurality of components related to both of the them are managed in a unified way, it is possible to improve the management efficiency of the version number of the components and the management efficiency of the components and to prevent a working error as compared with the conventional management in which components related to both of them are separately managed.

Further, as shown in FIG. 2, since the plurality of components constitute the hierarchical structure, it is possible to easily take out the n-th layer component drawing from the first layer component drawing based on the meta-information by using the reference-related client 30 (or the reception-related client 40 or the object machine 50).

Further, since the meta-information $F_1$ shown in FIG. 4 comprises the content of the <WEB FILTER> tag, it is possible to take security measures related to the reception of or the reference to the component for extremely small unit of each component.

Further, since the component comprises the patch information and the patch processing is automatically performed by the reception-related client 40 side, it is possible to prevent a working error and to shorten working hours as compared with the conventional manual patch work.

Further, as shown in FIG. 2, since the plurality of components constitute the hierarchical structure, it is possible to easily retrieve a desired component from among the meta-information without separating the hardware from the firmware.

Further, in the case where the component is revised or in the case where a new component is registered in the component data base DB1, the reception-related client 40 or the reference-related client 30 can take out the applicable component in real time (or at an arbitrary time) when it receives the revised design notice (ECO) or the new design notice (NRN). Accordingly, it is possible to prevent the omission of notice and to improve working efficiency because the client can take out the applicable component during the night time.

Further, since the management server 10 can conduct communications related to the development consignment of the product with the client 60 to which the development is consigned, it is possible to establish communications related to the development consignment, which results in shortening a period required to develop the product.

In addition, since the management server 10 conducts communications to get the permission of quoting the part catalog C with the vendor side client 70, it is possible to quickly get the permission of quoting the part catalog C.

Up to this point, while a preferred embodiment in accordance with the present invention has been described with reference to the drawings, it is not intended to limit the present invention to the specific constitution of the preferred embodiment, but the present invention may be further modified in design within the spirit and scope of the appended claims. For example, in the above preferred embodiment, it is also recommended that a component management program to realize the function of the management server 10 be recorded in a computer-readable recording medium 200 shown in FIG. 35 and that a series of management related to the components be performed by entering the component management program recorded in the recording medium 200 and executing it.

Figure 35:
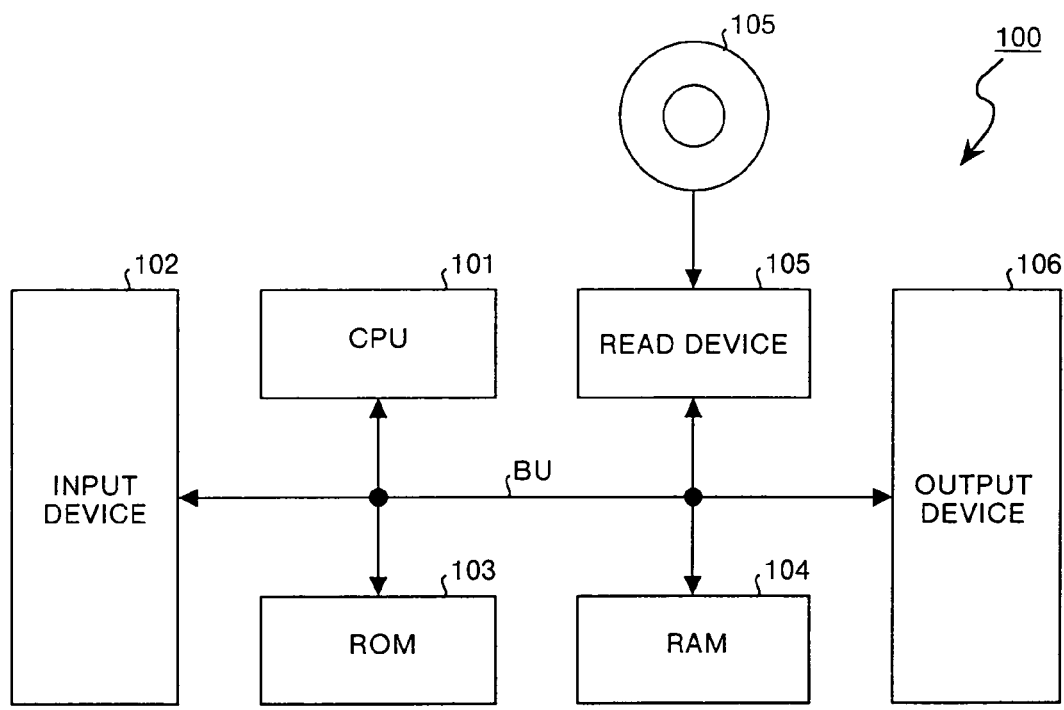
FIG. 35 is a block diagram showing a modification of the preferred embodiment in accordance with the present invention.
Figure 36:
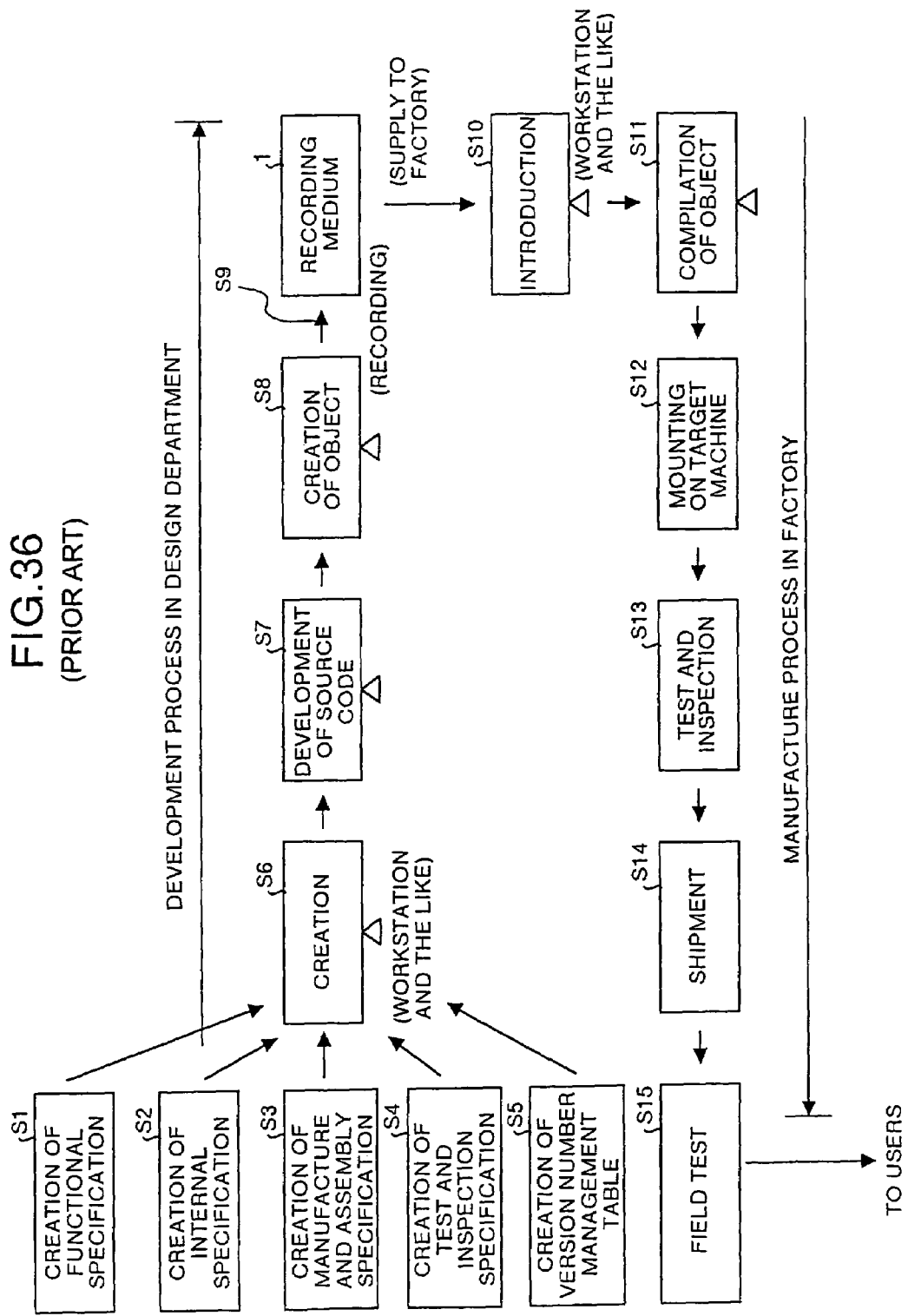
FIG. 36 is an illustration describing the development and manufacture of a product in a prior art.

A computer 100 shown in FIG. 35 is composed of a CPU 101 for executing the above component management program, an input device 102 such as a keyboard, a mouse and the like, a ROM (read only memory) 103 for storing various kinds of data, a RAM (random access memory) 104 for storing an arithmetic parameter and the like, a read device 105 for reading the component management program from the recording medium 200, an output device 106 such as a display, a printer and the like, and a bus BU connecting the devices.

The CPU 101 reads the component management program recorded in the recording medium 200 via the read device 105 and then executes the component management program to manage the above components. In this connection, the recording medium 200 comprises not only a portable recording medium such as an optical disc, a floppy disc, a hard disc or the like but also a transmitting medium for temporarily recording and storing data such as a network.

As described above, according to this invention, since the hardware and the firmware are regarded as the same management level and a plurality of components related to both of the them are managed in a unified way, the present invention produces an effect of improving the management efficiency of the version number of the components and the management efficiency of the components and an effect of preventing a working error as compared with the conventional management in which components related to both of them are separately managed.

Further, since the plurality of components constitute the hierarchical structure, the present invention produces an effect that an client can easily take out a low-layer component from a high-layer component based on the meta-information.

Further, since the meta-information comprises taking-out limiting information related to the permission/non-permission of taking-out for each component, the present invention produces an effect of taking security measures for extremely small unit of each component.

Further, since the component comprises the patch information and the patch processing is automatically performed by the client side, the present invention produce an effect of preventing a working error and an effect of shortening working hours as compared with the conventional manual patch work.

Further, since the plurality of components constitute the hierarchical structure, the present invention produces an effect of easily retrieving a desired component from among the meta-information without separating the hardware from the firmware.

Further, in the case where the component is revised or in the case where a new component is registered in the component data base DB1, the client can take out the applicable component in real time (or at an arbitrary time) when the client receives the revised design notice (ECO) or the new design notice (NRN). Accordingly, the present invention produces an effect of preventing the omission of notice and an effect of improving working efficiency because the client can take out the applicable component during the night time.

Further, since the management unit can conduct communications related to the development consignment of the product with the development maker side client, the present invention produce an effect of quickly establishing communications related to the development consignment, which results in shortening a period required to develop the product.

Further, since the management unit conducts communications to get the permission of quoting the part catalog with the author side client, the present invention produces an effect of quickly getting the permission of quoting the part catalog.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A component management system comprising:
a storage unit storing hardware and firmware related electronic information components as a hardware and firmware component knowledge database, each hardware and firmware related electronic information component being electronic information generated during processes including design, development, manufacture, and inspection, of a product,
wherein the hardware and firmware related electronic information components include at least one of a drawing of a hardware constituting the product, a firmware, a program, a specification, and a contract for the product, as the electronic information,
wherein said hardware and firmware related electronic information components as a variety of electronic information generated during the processes including the design, development, manufacture, and inspection of the product constitute a hierarchical structure in which the hardware and firmware related electronic information components are stored according to a numbering system common to both hardware and firmware electronic information components and added to each hardware and firmware electronic information component,
wherein said storage unit stores meta-information according to Extensible Markup Language (XML) data expressing the hierarchical structure of the hardware and firmware related electronic information components, and
wherein said hardware and firmware related electronic information components constituting said product are at a same management level;
a server which manages the hardware and firmware component knowledge database stored in said storage unit; and
at least one client, which is connected to said server via a network, and accesses a a desired hardware and firmware related electronic information component from said hardware and firmware related electronic information components constituting the hierarchical structure based on the meta information.

2. A component management device comprising:
a storage unit storing hardware and firmware related electronic information components as a hardware and firmware component knowledge database, each hardware and firmware related electronic information component being electronic information generated in processes including design, development, manufacture, and inspection, of a product,
wherein the hardware and firmware related electronic information components include at least one of a drawing of a hardware constituting the product, a firmware, a program, a specification, and a contract constituting the product, as the electronic information,
wherein said hardware and firmware related electronic information components as a variety of electronic information generated during the processes including the design, development, manufacture and inspection of the product constitute a hierarchical structure in which the hardware and firmware related electronic information components are stored according to a numbering system common to both hardware and firmware electronic information components and added to each hardware and firmware electronic information component,
wherein said storage unit stores meta-information according to Extensible Markup Language (XML) data expressing the hierarchical structure of the hardware and firmware related electronic information components, and
wherein said hardware and firmware related electronic information components constituting said product are at a same management level; and
a management unit managing the hardware and firmware component knowledge database by controlling a process of a client accessing a desired hardware and firmware related electronic information component from among said hardware and firmware related electronic information components constituting the hierarchical structure based on the meta information.

3. The component management device according to claim 2, wherein the meta-information comprises access limiting information related to permission/non-permission of access to each hardware and firmware related electronic information component, and wherein said client accesses the desired hardware and firmware related electronic information component based on the access limiting information only when said client gets permission.

4. The component management device according to claim 2, wherein said hardware and firmware related electronic information component comprises patch information for automatically performing a patch processing to an applicable firmware, and wherein said client performs the patch processing to the applicable firmware based on the patch information.

5. The component management device according to claim 2, wherein said client retrieves the desired hardware and firmware related electronic information component based on meta-information.

6. The component management device according to claim 2, wherein said management unit sends a notice of revision to said client via said network when a hardware and firmware related electronic information component already stored in said storage unit is revised and sends a notice of new registration to said client via said network when a new hardware and firmware related electronic information component is registered in said storage unit, and wherein said client takes out said desired hardware and firmware related electronic information component at an arbitrary timing after said client receives the notice of revision or the notice of new registration.

7. The component management device according to claim 2, wherein said management unit conducts communications related to a development consignment of said product with a development maker side client placed in an external development maker and connected thereto via said network.

8. A component development data management device comprising:
a storage unit storing hardware and firmware development data, including design, manufacture and inspection data, generated to constitute a product, as a component development knowledge database, wherein said hardware and said firmware development data, including the design, the manufacture and the inspection data, constituting said product are at a same management level; and a management unit managing the component development knowledge database by controlling a process of a client accessing the hardware and firmware development data, including the design, the manufacture and the inspection data, from said storage unit via a network, and conducting communications for getting a permission of quotation of a catalog of parts constituting said product based upon the hardware and firmware development data, including the design, the manufacture and the inspection data, with an author side client placed in the author side issuing the catalog and registering the catalog as a database in said storage unit when the management unit gets the permission.

9. A computer-readable recording medium recording a component management program controlling a computer according to a process comprising:
   storing hardware and firmware related electronic information components as a hardware and firmware component knowledge database, each hardware and firmware related electronic information component being electronic information generated during processes including design, development, manufacture, and inspection, of a product,
      wherein the hardware and firmware related electronic information components include at least one of a drawing of a hardware constituting the product, a firmware, a program, a specification, and a contract for the product, as the electronic information,
      wherein said hardware and firmware related electronic information components as variety of electronic information generated during the processes including the design, development, manufacture, and inspection of the product constitute a hierarchical structure in which the hardware and firmware related electronic information components are stored according to a numbering system common to both hardware and firmware electronic information components and added to each hardware and firmware electronic information component,
      wherein the storing comprises storing meta-information according to Extensible Markup Language (XML) data expressing the hierarchical structure of the hardware and firmware related electronic information components, and
      wherein said hardware and firmware related electronic information components constituting said product are at a same management level; and
   managing the component knowledge database by controlling a process of a client accessing a desired hardware and firmware related electronic information component from said hardware and firmware related electronic information components constituting the hierarchical structure based on the meta-information.

10. A component knowledge system, comprising:
   a programmed computer processor controlling the component knowledge system according to a process comprising:
      generating, storing and managing meta-information by treating at same management level varyingly managed and related electronic information components that are hardware and firmware related electronic information generated in processes including design, development, manufacture, and inspection, of a product and include at least one of a drawing of a hardware constituting the product, a firmware, a program, a specification, and a contract constituting the product,
         wherein said hardware and firmware related electronic information components as a variety of electronic information generated during the processes including the design, development, manufacture, and inspection of the product constitute a hierarchical structure in which the hardware and firmware related electronic information components are stored according to a numbering system common to both hardware and firmware electronic information components and added to each hardware and firmware electronic information component, and
         wherein the meta-information is stored according to Extensible Markup Language (XML) data expressing the hierarchical structure of the hardware and firmware related electronic information components, and
      controlling a process of a client accessing a desired hardware and firmware related electronic information component from said hardware and firmware related electronic information components constituting the hierarchical structure based on the meta-information.

11. The component management system of claim 1, wherein patch information of each firmware electronic information component is included as a subclass in the numbering system.

12. The component management system of claim 1, wherein the XML data comprises destination information of the hardware and firmware related electronic information components.

13. The component management system of claim 1, wherein the XML data comprises new and revised design notice information of the hardware and firmware related electronic information components.

* * * * *

UNITED STATES PATENT AND TRADEMARK OFFICE
CERTIFICATE OF CORRECTION

| | | |
|---|---|---|
| PATENT NO. | : 7,321,896 B1 | Page 1 of 1 |
| APPLICATION NO. | : 09/626965 | |
| DATED | : January 22, 2008 | |
| INVENTOR(S) | : Tadashi Ohashi | |

It is certified that error appears in the above-identified patent and that said Letters Patent is hereby corrected as shown below:

Column 35, Line 44 Claim 1, before "desired" delete "a".

Column 35, Line 66 Claim 2, after "manufacture" insert --,--.

Column 36, Line 19 Claim 2, after "from" delete "among".

Column 36, Line 21 Claim 2, change "meta information" to --meta-information--.

Column 36, Line 49 Claim 6, change "takes out" to --accesses--.

Column 37, Line 5 Claim 8, change "data," to --data--.

Column 37, Line 30 Claim 9, after "as" insert --a--.

Signed and Sealed this

Eighth Day of July, 2008

JON W. DUDAS
*Director of the United States Patent and Trademark Office*